United States Patent
Shi et al.

(10) Patent No.: US 10,728,683 B2
(45) Date of Patent: Jul. 28, 2020

(54) SWEET SPOT ADAPTATION FOR VIRTUALIZED AUDIO

(71) Applicant: DTS, Inc., Calabasas, CA (US)

(72) Inventors: Guangji Shi, San Jose, CA (US); Vlad Ionut Ursachi, Santa Clara, CA (US); Daekyoung Noh, Huntington Beach, CA (US); Themis George Katsianos, Highland, CA (US); Antonius Kalker, Mountain View, CA (US); Petronel Bigioi, Salthill (IE); Jean-Marc Jot, Aptos, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/119,368

(22) Filed: Aug. 31, 2018

(65) Prior Publication Data

US 2019/0075418 A1 Mar. 7, 2019

Related U.S. Application Data

(60) Provisional application No. 62/553,453, filed on Sep. 1, 2017.

(51) Int. Cl.
| | |
|---|---|
| *H04S 7/00* | (2006.01) |
| *G06T 7/73* | (2017.01) |
| *G06T 7/80* | (2017.01) |
| *G06T 7/60* | (2017.01) |
| *H04S 3/00* | (2006.01) |

(52) U.S. Cl.
CPC .............. *H04S 7/303* (2013.01); *G06T 7/73* (2017.01); *G06T 7/60* (2013.01); *G06T 7/80* (2017.01); *G06T 2207/10024* (2013.01); *G06T 2207/10028* (2013.01); *G06T 2207/30201* (2013.01); *H04S 3/008* (2013.01); *H04S 2400/01* (2013.01); *H04S 2400/13* (2013.01); *H04S 2420/01* (2013.01)

(58) Field of Classification Search
CPC combination set(s) only.
See application file for complete search history.

(56) References Cited

U.S. PATENT DOCUMENTS

| | | | |
|---|---|---|---|
| 6,741,273 B1 * | 5/2004 | Waters | H04S 7/302 |
| | | | 348/61 |
| 6,937,745 B2 | 8/2005 | Toyama | |

(Continued)

FOREIGN PATENT DOCUMENTS

| | | |
|---|---|---|
| WO | WO-2016180493 A1 | 11/2016 |
| WO | WO-2019046706 A1 | 3/2019 |

OTHER PUBLICATIONS

"International Application Serial No. PCT/US2018/049075, International Search Report dated Nov. 2, 2018", 2 pgs.

(Continued)

*Primary Examiner* — Duc Nguyen
*Assistant Examiner* — Assad Mohammed
(74) *Attorney, Agent, or Firm* — Schwegman Lundberg & Woessner, P.A.

(57) ABSTRACT

Systems and methods discussed herein can provide three-dimensional audio virtualization with sweet spot adaptation. In an example, an audio processor circuit can be used to update audio signals for sweet spot adaptation based on information from at least one depth sensor or camera about a listener position in a listening environment.

20 Claims, 11 Drawing Sheets

(56) References Cited

U.S. PATENT DOCUMENTS

| | | | |
|---|---|---|---|
| 7,095,455 B2 | 8/2006 | Jordan et al. | |
| 7,860,260 B2 * | 12/2010 | Kim | H04S 7/302 381/17 |
| 8,000,485 B2 | 8/2011 | Walsh et al. | |
| 8,472,632 B2 | 6/2013 | Riedel | |
| 8,970,770 B2 * | 3/2015 | Nanu | H04N 5/23219 348/345 |
| 8,995,715 B2 | 3/2015 | Sultana et al. | |
| 9,218,530 B2 | 12/2015 | Davis et al. | |
| 9,225,822 B2 | 12/2015 | Davis et al. | |
| 9,426,598 B2 | 8/2016 | Walsh et al. | |
| 9,484,046 B2 | 11/2016 | Knudson et al. | |
| 9,639,775 B2 | 5/2017 | Sultana et al. | |
| 2003/0031333 A1 | 2/2003 | Cohen et al. | |
| 2007/0116306 A1 | 5/2007 | Riedel et al. | |
| 2007/0127730 A1 * | 6/2007 | Kim | H04S 1/002 381/60 |
| 2007/0154019 A1 * | 7/2007 | Kim | H04S 1/00 381/17 |
| 2008/0166025 A1 * | 7/2008 | Thorne | G06K 9/00228 382/118 |
| 2010/0323793 A1 * | 12/2010 | Andall | H04S 7/303 463/35 |
| 2011/0316966 A1 * | 12/2011 | Lee | H04N 7/142 348/14.16 |
| 2012/0116559 A1 | 5/2012 | Davis et al. | |
| 2012/0155680 A1 * | 6/2012 | Chen | H04R 27/00 381/306 |
| 2012/0195444 A1 * | 8/2012 | Lee | H03G 3/3089 381/107 |
| 2013/0083948 A1 * | 4/2013 | Schmidt | H04S 7/302 381/303 |
| 2013/0121515 A1 | 5/2013 | Hooley et al. | |
| 2014/0328505 A1 * | 11/2014 | Heinemann | H04S 7/303 381/303 |
| 2014/0357312 A1 | 12/2014 | Davis et al. | |
| 2015/0016642 A1 | 1/2015 | Walsh et al. | |
| 2015/0163613 A1 | 6/2015 | Akiba et al. | |
| 2015/0223002 A1 | 8/2015 | Mehta et al. | |
| 2015/0277841 A1 * | 10/2015 | Lanier | G06F 3/014 345/428 |
| 2015/0286873 A1 | 10/2015 | Davis et al. | |
| 2015/0373477 A1 * | 12/2015 | Norris | H04M 1/72572 381/303 |
| 2016/0021481 A1 * | 1/2016 | Johnson | H04S 7/303 381/303 |
| 2016/0134986 A1 * | 5/2016 | Liu | H04N 13/128 381/303 |
| 2016/0309276 A1 | 10/2016 | Ridihalgh et al. | |
| 2016/0353223 A1 | 12/2016 | Freeman | |
| 2017/0188140 A1 * | 6/2017 | Duzinkiewicz | H04R 3/005 |
| 2017/0236006 A1 | 8/2017 | Davis et al. | |
| 2018/0063665 A1 * | 3/2018 | Walker | G06F 3/0482 |
| 2018/0136898 A1 | 5/2018 | Shi et al. | |
| 2018/0262730 A1 * | 9/2018 | Kim | G06F 3/14 |
| 2019/0116452 A1 | 4/2019 | Shi et al. | |

OTHER PUBLICATIONS

"International Application Serial No. PCT/US2018/049075, Written Opinion dated Nov. 2, 2018", 12 pgs.

"U.S. Appl. No. 16/228,740, Non Final Office Action dated Sep. 4, 2019", 41 pgs.

"International Applicatipon Serial No. PCT/US2018/049075, International Preliminary Report on Patentability dated Nov. 12, 2019", 15 pgs.

* cited by examiner

SWEET SPOT ADAPTATION FOR VIRTUALIZED AUDIO

CLAIM OF PRIORITY

This patent application claims the benefit of priority to U.S. Provisional Patent Application No. 62/553,453, filed on Sep. 1, 2017, which is incorporated by reference herein in its entirety.

BACKGROUND

Audio plays a significant role in providing a content-rich multimedia experience in consumer electronics. The scalability and mobility of consumer electronic devices along with the growth of wireless connectivity provides users with instant access to content. Various audio reproduction systems can be used for playback over headphones or loudspeakers. In some examples, audio program content can include more than a stereo pair of audio signals, such as including surround sound or other multiple-channel configurations.

A conventional audio reproduction system can receive digital or analog audio source signal information from various audio or audio/video sources, such as a CD player, a TV tuner, a handheld media player, or the like. The audio reproduction system can include a home theater receiver or an automotive audio system dedicated to the selection, processing, and routing of broadcast audio and/or video signals. Audio output signals can be processed and output for playback over a speaker system. Such output signals can be two-channel signals sent to headphones or a pair of frontal loudspeakers, or multi-channel signals for surround sound playback. For surround sound playback, the audio reproduction system may include a multichannel decoder.

The audio reproduction system can further include processing equipment such as analog-to-digital converters for connecting analog audio sources, or digital audio input interfaces. The audio reproduction system may include a digital signal processor for processing audio signals, as well as digital-to-analog converters and signal amplifiers for converting the processed output signals to electrical signals sent to the transducers. The loudspeakers can be arranged in a variety of configurations as determined by various applications. Loudspeakers, for example, can be stand-alone units or can be incorporated in a device, such as in the case of consumer electronics such as a television set, laptop computer, hand held stereo, or the like. Due to technical and physical constraints, audio playback can be compromised or limited in such devices. Such limitations can be particularly evident in electronic devices having physical constraints where speakers are narrowly spaced apart, such as in laptops and other compact mobile devices. To address such audio constraints, various audio processing methods are used for reproducing two-channel or multi-channel audio signals over a pair of headphones or a pair of loudspeakers. Such methods include compelling spatial enhancement effects to improve the listener's experience.

Various techniques have been proposed for implementing audio signal processing based on Head-Related Transfer Function (HRTF) filtering, such as for three-dimensional audio reproduction using headphones or loudspeakers. In some examples, the techniques are used for reproducing virtual loudspeakers, such as can be localized in a horizontal plane with respect to a listener, or located at an elevated position with respect to the listener. To reduce horizontal localization artifacts for listener positions away from a "sweet spot" in a loudspeaker-based system, various filters can be applied to restrict the effect to lower frequencies.

Audio signal processing can be performed at least in part using an audio virtualizer. An audio virtualizer can include a system, or portion of a system, that provides a listener with a three-dimensional (3D) audio listening experience using at least two loudspeakers. However, such a virtualized 3D audio listening experience can be limited to a relatively small area or specific region in a playback environment, commonly referred to as a sweet spot, where the 3D effect is most impactful on the listener. In other words, 3D audio virtualization over loudspeakers is generally most compelling for a listener located at the sweet spot. When the listener is outside of the sweet spot, the listener experiences inaccurate localization of sound sources and unnatural coloration of the audio signal. Thus the 3D audio listening experience is compromised or degraded for a listener outside of the sweet spot.

OVERVIEW

The present inventors have recognized that a problem to be solved includes determining a listener location in a listening environment and adjusting audio signal processing based on the listener location. A solution to the problem can include or use image information from a camera to help determine a listener location in the listening environment. The solution can further include determining a distance from a loudspeaker to the listener location, and selecting one or more transfer functions or filters to apply to one or more input audio signals based on the determined distance. In an example, the solution includes performing audio virtualization and sweet spot adaptation processing separately. For example, audio virtualization processing can include processing input audio signals using one or more head-related transfer function filters to yield virtualized audio signals, and sweet spot adaptation can include applying a gain and/or delay to one or more virtualized audio signals. In an example, the solution can include determining a head orientation (e.g., a head yaw, head pitch, or head roll) of the listener and adjusting one or more filters or sweet spot adapter parameters to accommodate a position of the listener's ears in the environment.

The present inventors have recognized that a problem to be solved includes determining the listener location in the listening environment, including determining a distance from the loudspeaker to the listener location. A solution to the problem can include or use information from a depth sensor, or from a camera about a listener face width. In an example, the solution can include correcting an effect of the camera's lens curvature on a measured listener face width. In an example, the solution can include correcting for a head orientation of the listener in determining the listener's actual distance from the camera or sensor.

Examples of the systems and methods discussed herein can include or use at least one sensor, such as a camera, to track a listener's position in real-time. The real-time listener position information can be used to continuously update or adjust parameters of an audio virtualization or sweet spot adapter circuit. In some examples, the systems and methods can be configured to change a sweet spot location in a listening environment to accommodate a listener moving in the environment.

Examples of the systems and methods discussed herein can be used to estimate a listener position based on a size and position of the listener's head or face, a position of the listener's eyes, or both. In some examples, listener position information includes an azimuth angle and a distance to the image source or camera. In some examples, listener position information further includes orientation information such as an elevation angle, head yaw, head pitch, and/or head roll angle. In some examples, listener position information is filtered or smoothed to reduce signal processing fluctuations. Various examples of the systems and methods discussed herein can be applied with televisions, sound bars, laptop computers, tablets, desktop computers, and mobile phones, among other devices and media reproduction systems.

In some examples, a single camera is used to detect a listener's position and, in response, adjust audio signal processing to change a sweet spot location for reproduced audio. In some examples, a listener's position is estimated based on a size and/or position of the listener's face, positions of the eyes, or a combination of such techniques. In some examples, a sweet spot adapter circuit can be configured to operate using other camera and speaker configurations. Other examples can be configured to provide feedback through a user interface (UI) to the listener regarding a status of the sweet spot adapter circuit.

The above-mentioned features or examples provide several advantages. For example, one advantage is that embodiments of the systems and methods can be intuitive to a user or listener and use minimal user input. Moreover, there can be no additional hardware cost for systems that already have a built-in camera and two speakers (such as laptop computer, tablet, all-in-one computer, or TV with a built-in camera). Examples of the systems and methods can work with various types of depth sensors or cameras (e.g., still cameras, video cameras, IR cameras, etc.), or other listener position-informing sensors, and speaker configurations.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

This overview is intended to provide a summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
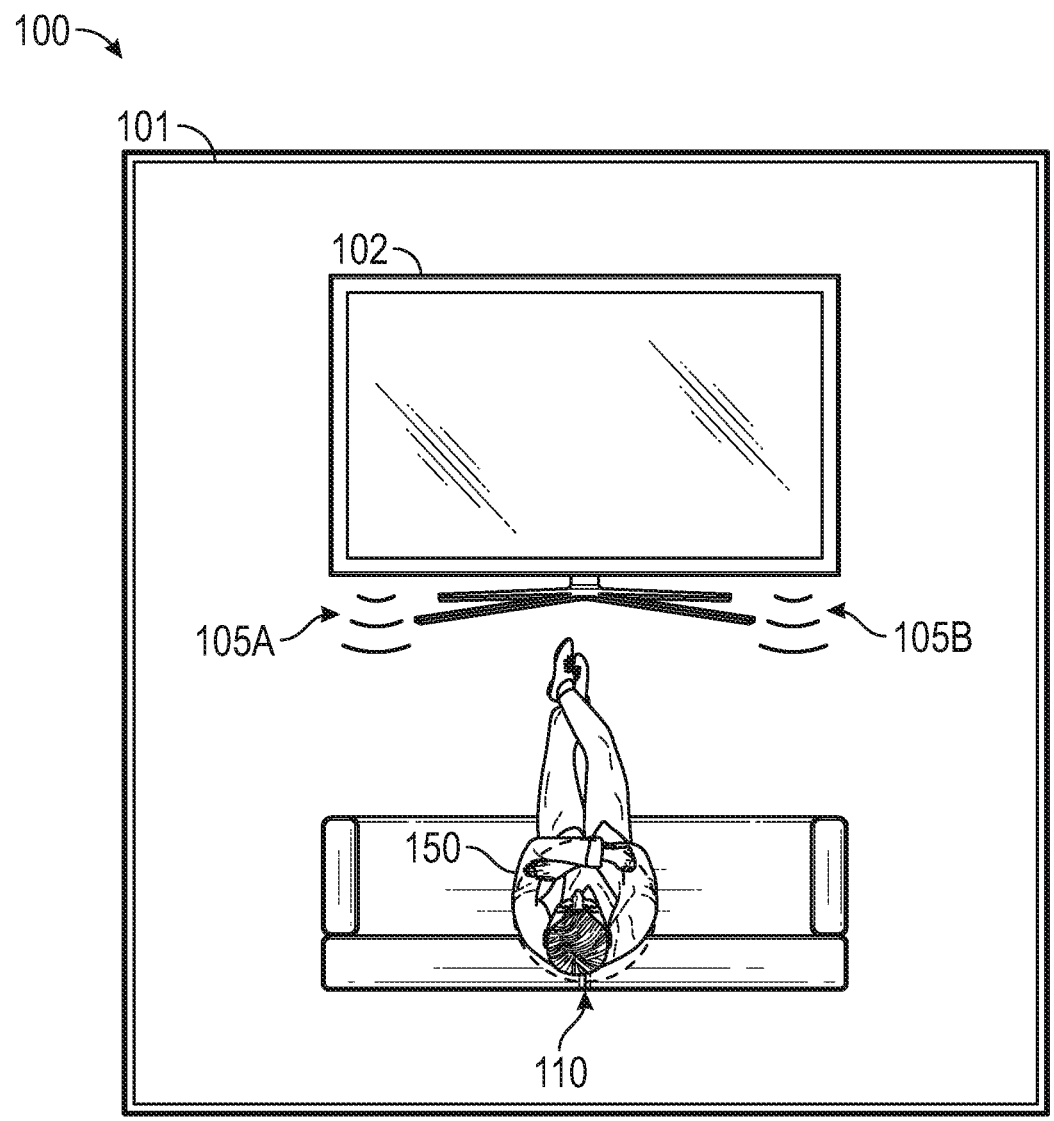
FIG. 1 illustrates generally an example of a listener in a sweet spot in a listening environment.

In the following description that includes examples of systems, methods, apparatuses, and devices for performing audio signal virtualization processing, such as for providing listener sweet spot adaptation in an environment using information from a camera about a listener location, position, and/or orientation in the environment, reference is made to the accompanying drawings, which form a part of the detailed description. The drawings show, by way of illustration, specific embodiments in which the inventions disclosed herein can be practiced. These embodiments are generally referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

As used herein, the phrase "audio signal" is a signal that is representative of a physical sound. Audio processing systems and methods described herein can include hardware circuitry and/or software configured to use or process audio signals using various filters. In some examples, the systems and methods can use signals from, or signals corresponding to, multiple audio channels. In an example, an audio signal can include a digital signal that includes information corresponding to multiple audio channels.

Various audio processing systems and methods can be used to reproduce two-channel or multi-channel audio signals over various loudspeaker configurations. For example, audio signals can be reproduced over headphones, over a pair of bookshelf loudspeakers, or over a surround sound or immersive audio system, such as using loudspeakers positioned at various locations in an environment with respect to a listener. Some examples can include or use compelling spatial enhancement effects to enhance a listening experience, such as where a number or orientation of physical loudspeakers is limited.

In U.S. Pat. No. 8,000,485, to Walsh et al., entitled "Virtual Audio Processing for Loudspeaker or Headphone Playback", which is hereby incorporated by reference in its entirety, audio signals can be processed with a virtualizer processor circuit to create virtualized signals and a modified stereo image. Additionally or alternatively to the techniques in the '485 patent, the present inventors have recognized that virtualization processing can be used to tailor sound reproduction for a particular listener in a particular listener location. That is, the virtualization processing discussed herein can be used to provide a "sweet spot" where three-dimensional audio is most effectively received by a listener.

In an example, relative virtualization filters, such as can be derived from head-related transfer functions, can be applied to render 3D audio information that is perceived by a listener as including sound information at various specified altitudes, or elevations, above or below a listener to further enhance a listener's experience. In an example, such virtual audio information is reproduced using a loudspeaker provided in a horizontal plane and the virtual audio information is perceived to originate from a loudspeaker or other source that is elevated relative to the horizontal plane, such as even when no physical or real loudspeaker exists in the perceived origination location. In an example, the virtual audio information provides an impression of sound elevation, or an auditory illusion, that extends from, and optionally includes, audio information in the horizontal plane. Similarly, virtualization filters can be applied to render virtual audio information perceived by a listener as including sound information at various locations within or among the horizontal plane, such as at locations that do not correspond to a physical location of a loudspeaker in the sound field. The virtual audio information perceived by the listener can follow a listener as the listener moves in the listening environment, such as by changing a sweet spot in response to information from a camera about the listener's location in the environment.

Examples of the systems and methods discussed herein can use information from at least one camera to obtain information about a position of a listener, or an estimate of a position of a listener, in real-time. The systems and methods can use the listener position information to adjust an audio output so that the listener can enjoy a 3D audio listening experience at the listener's position, which can be outside of a default sweet spot in the environment. The default sweet spot can be a location in the environment that would be the sweet spot when default virtualization processing, or no enhanced or other virtualization processing, is applied.

Examples of the systems discussed herein can include or use an audio virtualizer circuit. The audio virtualizer circuit can include a binaural synthesizer and a crosstalk canceller. The systems can further include a camera-based listener position estimation module that receives visual or optical information about an environment and determines or calculates a spatial position of the listener, such as by detecting and analyzing one or more facial features and their positions. In an example, the systems can further include a sweet-spot adapter circuit configured to enhance a listening experience for the listener based on the determined spatial position of the listener.

In an example, audio virtualization processing of audio input signals, such as can be performed using an audio processor circuit or audio virtualizer circuit, can render output signals that can be reproduced using two or more loudspeakers to provide a 3D audio experience to a listener. The 3D audio experience is generally limited to a small area or region in an environment that includes the two or more loudspeakers. The small area or region, referred to as the sweet spot, represents a location where the 3D audio experience is most pronounced and effective for providing a multi-dimensional listening experience for the listener. When the listener is away from the sweet spot, the listening experience degrades, which can lead to inaccurate localization of sound sources in the 3D space. Furthermore, unnatural signal coloration can occur or can be perceived by the listener outside of the sweet spot.

FIG. 1 illustrates generally an example 100 of a listener 150 in a first sweet spot 110 in a listening environment 101. In the example of FIG. 1, the listening environment 101 includes a generally rectangular room. Although the listening environment 101 is depicted in two dimensions, it is to be understood as including a three-dimensional environment that can be occupied by the listener 150 and one or more sound reproduction devices, among other things.

The listening environment 101 includes a television 102. The television 102 includes a pair of left and right speakers 105A and 105B. Although the pair of speakers 105A and 105B are illustrated as being integrated with the television 102, the pair of speakers 105A and 105B could be loudspeakers provided externally to the television 102, and optionally can be driven by a source other than a television. The pair of speakers 105A and 105B are oriented to project sound away from the face of the television 102 and toward an area in the listening environment 101 where the listener 150 is most likely to be positioned.

The example of FIG. 1 illustrates generally an example of the first sweet spot 110, and the first sweet spot 110 represents a physical location in the listening environment 101 where 3D audio effects, such as included in sounds reproduced using the pair of speakers 105A and 105B, are perceived accurately by the listener 150. Although the first sweet spot 110 is illustrated in FIG. 1 as a two-dimensional area, the first sweet spot 110 can be understood to include a three-dimensional volume in the listening environment 101. In the example of FIG. 1, the listener 150 is located at the first sweet spot 110. That is, a head or ears of the listener 150 are located at or in the first sweet spot 110.

In an example, the pair of speakers 105A and 105B receives signals from an audio signal processor that includes or uses a virtualizer circuit to generate virtualized or 3D audio signals from one or more input signals. The audio signal processor can generate the virtualized audio signals using one or more HRTF filters, delay filters, frequency filters, or other audio filters.

Figure 2:
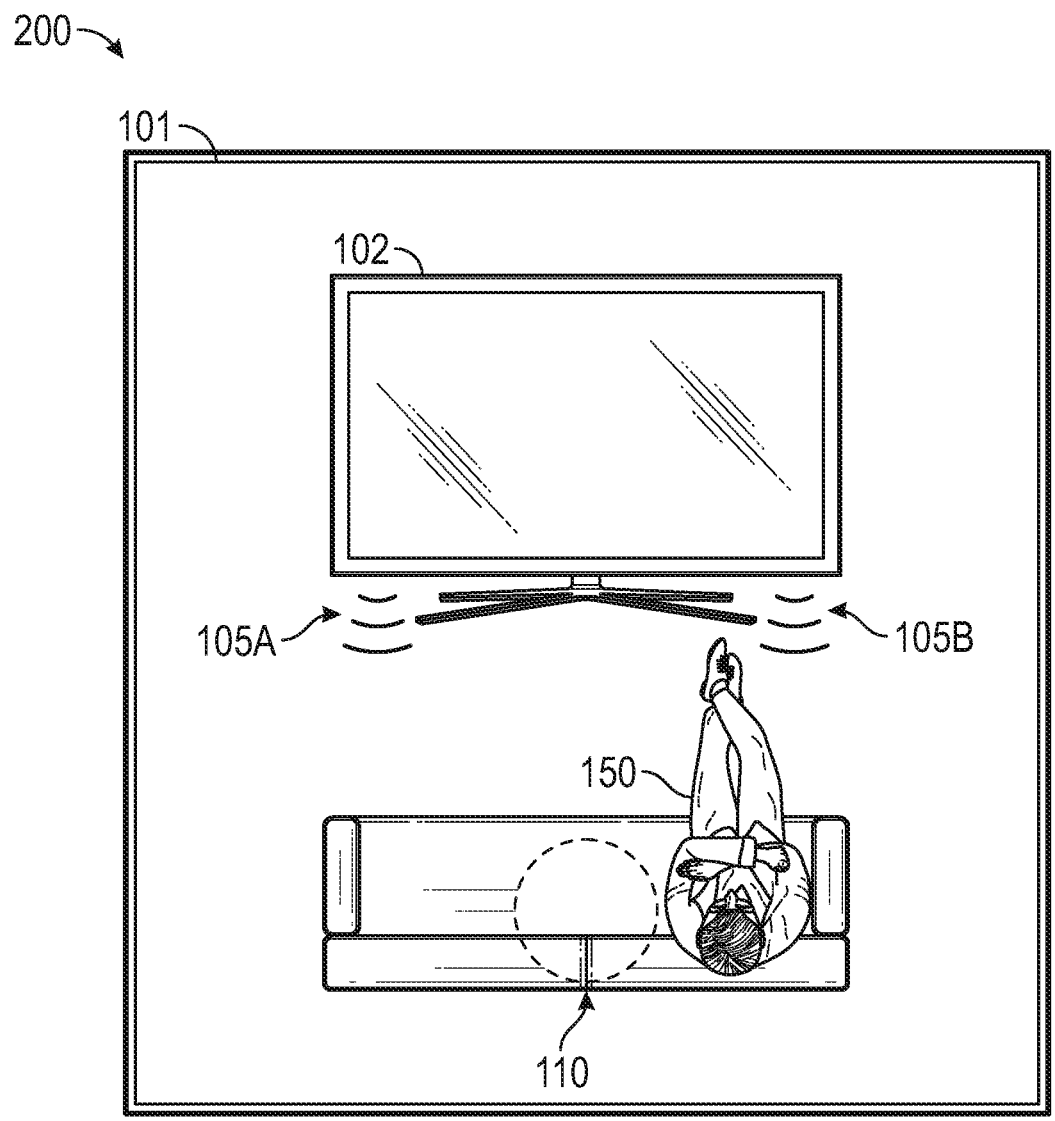
FIG. 2 illustrates generally an example of a listener outside of a sweet spot in a listening environment.

FIG. 2 illustrates generally an example 200 of the listener 150 outside of the first sweet spot 110 in the listening environment 101. In the example 200, the listener 150 is positioned to the right side of the first sweet spot 110. Since the listener 150 is located outside of the first sweet spot 110, the listener 150 can experience or perceive less optimal audio source localization. In some examples, the listener 150 can experience unintended or disruptive coloration, phasing, or other sound artifacts that can be detrimental to the experience that listener 150 has with the audio program reproduced using the pair of speakers 105A and 105B. In an example, the systems and methods discussed herein can be used to process audio signals reproduced using the pair of speakers 105A and 105B to move the first sweet spot 110 to a second location that coincides with a changed or actual position of the listener 150 in the listening environment 101.

Figure 3:
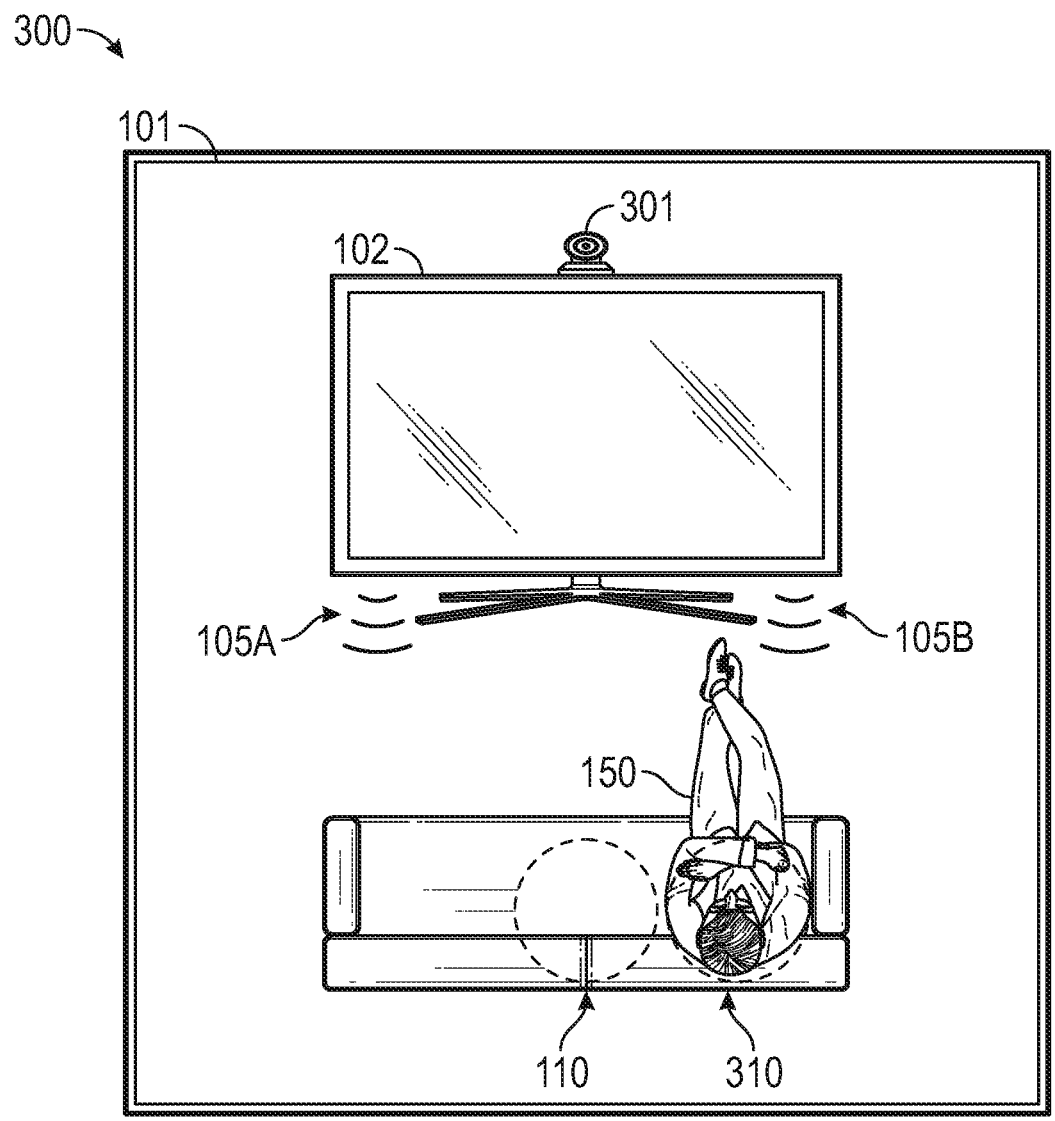
FIG. 3 illustrates generally an example of a listening environment with a camera configured to monitor a position of a listener.

FIG. 3 illustrates generally an example 300 of the listening environment 101 with a camera 301 configured to monitor a position of the listener 150. The camera 301 can include a camera configured to capture still or moving images or other optical or visual information about the listening environment 101. In an example, the camera 301 is configured to receive or sense information outside of the visible spectrum, such as including infrared or other frequency bands that can be used to detect a presence or absence of a body, such as belonging to the listener 150, in the listening environment 101.

Although cameras and visual information are discussed generally herein as being a preferred source of position information about the listener 150, other sensors or devices can similarly be used. For example, and without limitation, information from a microphone array, ultrasonic sensor(s), accelerometer(s), weight sensor(s), or other sensor configured to detect a listener body position or listener body orientation in an environment, can be used additionally or alternatively to the camera 301 to provide position information about the listener 150. In an example, a depth sensor can be used to detect the listener body position or listener body orientation. A depth sensor can include, among other things, a laser, a modulated light source, or a camera array.

In an example, the camera 301 is coupled to an image processor circuit. The image processor circuit can be configured to receive information from the camera 301 and determine or estimate a position of the listener 150, or other listener or object, in a field of view of the camera 301. In an example, the image processor circuit can be configured to use the information from the camera 301 to determine or estimate a position of one or more features of the listener 150, such as a position of one or more of the ears, eyes, mouth, or other feature of the listener 150.

In an example, the image processor circuit can estimate a position of the listener 150 based on a size and position of a face of the listener 150, a position of the eyes of the listener 150, or both. In an example, the position information about the listener 150 can include an azimuth angle and/or a distance to the camera 301. In some examples, the image processor circuit can determine or use other information about the listener 150, including listener orientation information such as an elevation angle, head yaw, head pitch, or head roll angle for the listener 150. The position information about the listener 150 can be filtered to reduce fluctuations. Some examples of determining a listener position are further discussed herein, for example, at FIGS. 9-12.

In an example, an audio processor circuit, such as can be configured to generate virtualized audio signals for the pair of speakers 105A and 105B, can be coupled to the camera 301 or to the image processor circuit. The audio processor circuit can use information from the camera 301 or from the image processor circuit about a position of the listener 150 to select one or more filters to apply to the audio signals before the signals are reproduced using the pair of speakers 105A and 105B. That is, the audio processor circuit can process audio signals based on information about a position of the listener 150, such as to update or adjust a position of a sweet spot in the listening environment 101.

In an example, the audio processor circuit processes audio signals based on one or more of an absolute position of the listener 150 in the listening environment 101, a determined distance of the listener 150 from the camera 301 and/or from one or more of the left and right speakers 105A and 105B, a position of the listener 150 relative to the first sweet spot 110, or other position information about the listener 150. In an example, the audio processor circuit processes audio signals based on a determined or estimated position of one or more features of the listener 150, such as a position of one or more of the ears, eyes, mouth, or other feature of the listener 150.

In the example of FIG. 3, the camera 301 can receive information about the listening environment 101, including information in the visual spectrum that includes an indication of a presence of the listener 150 in the listening environment. The image processor circuit can determine a relative or estimated position of the listener 150 in the listening environment 101 and the audio processor circuit can select one or more filters to apply to render virtualized audio information for the listener 150 when the listener is at the determined position. That is, the camera 301 and its corresponding image processor circuit can provide information to the audio processor circuit that the listener 150 has moved outside of the first sweet spot 110, and that virtualization filters should be selected for use that will render a second sweet spot 310.

The audio processor circuit can optionally receive information about the position of the listener 150 from the camera 301 continuously, periodically, or according to another fixed or adjustable schedule. In an example, the image processor circuit withholds position change information about the listener 150 until the listener 150 moves away from an initial position by at least a specified threshold amount. In an example, the audio processor circuit can determine whether or when information about a position of the listener 150 requires an audio signal processing parameter change or update.

Figure 4:
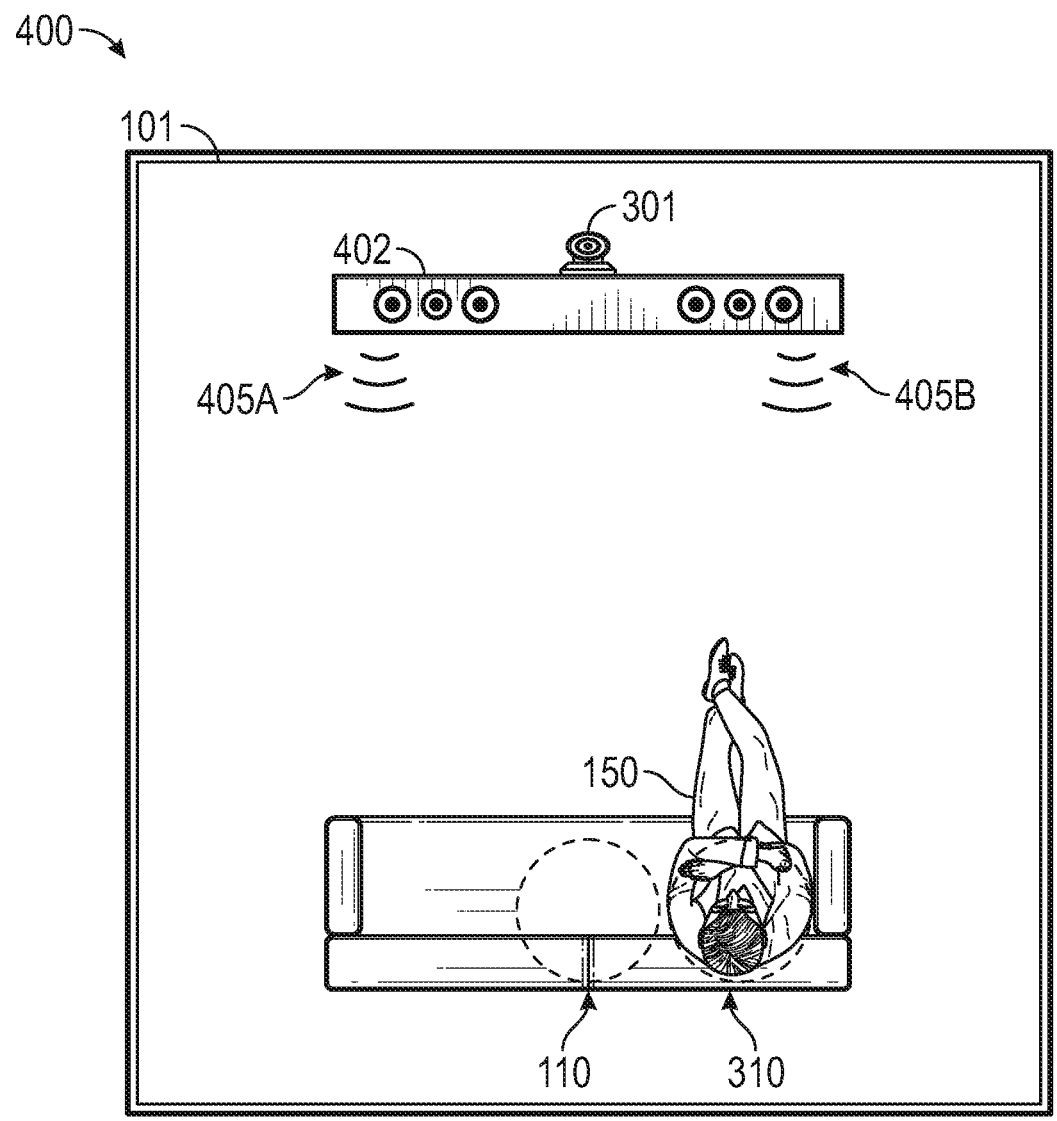
FIG. 4 illustrates generally an example of a listening environment with a soundbar and a camera.

FIG. 4 illustrates generally an example 400 of the listening environment 101 with a soundbar 402 and the camera 301. That is, FIG. 4 illustrates that the listening environment 101 can include or use a sound source other than the television 102. The soundbar 402 can receive virtualized audio information and reproduce audio signals using a different pair of speakers 405A and 405B to provide a 3D audio experience for the listener 150. In an example, audio from the soundbar 402 can be adjusted to accommodate different sweet spots, such as the first sweet spot 110 and the second sweet spot 310, such as based on information about a position of the listener 150 from the camera 301.

Figure 5A:
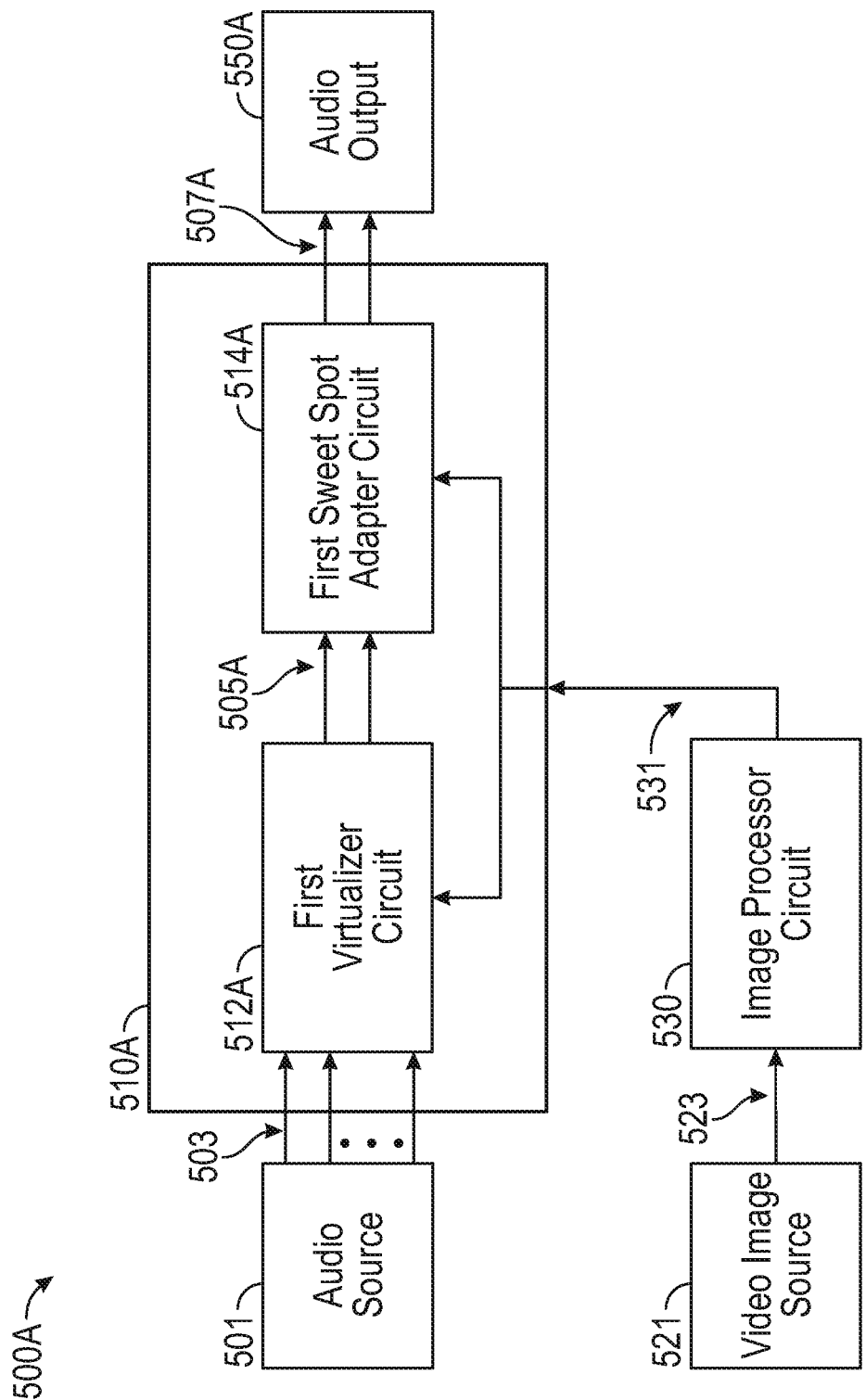
FIG. 5A illustrates generally an example of a block diagram of a first system that includes a virtualizer circuit and a sweet spot adapter circuit.
Figure 5B:
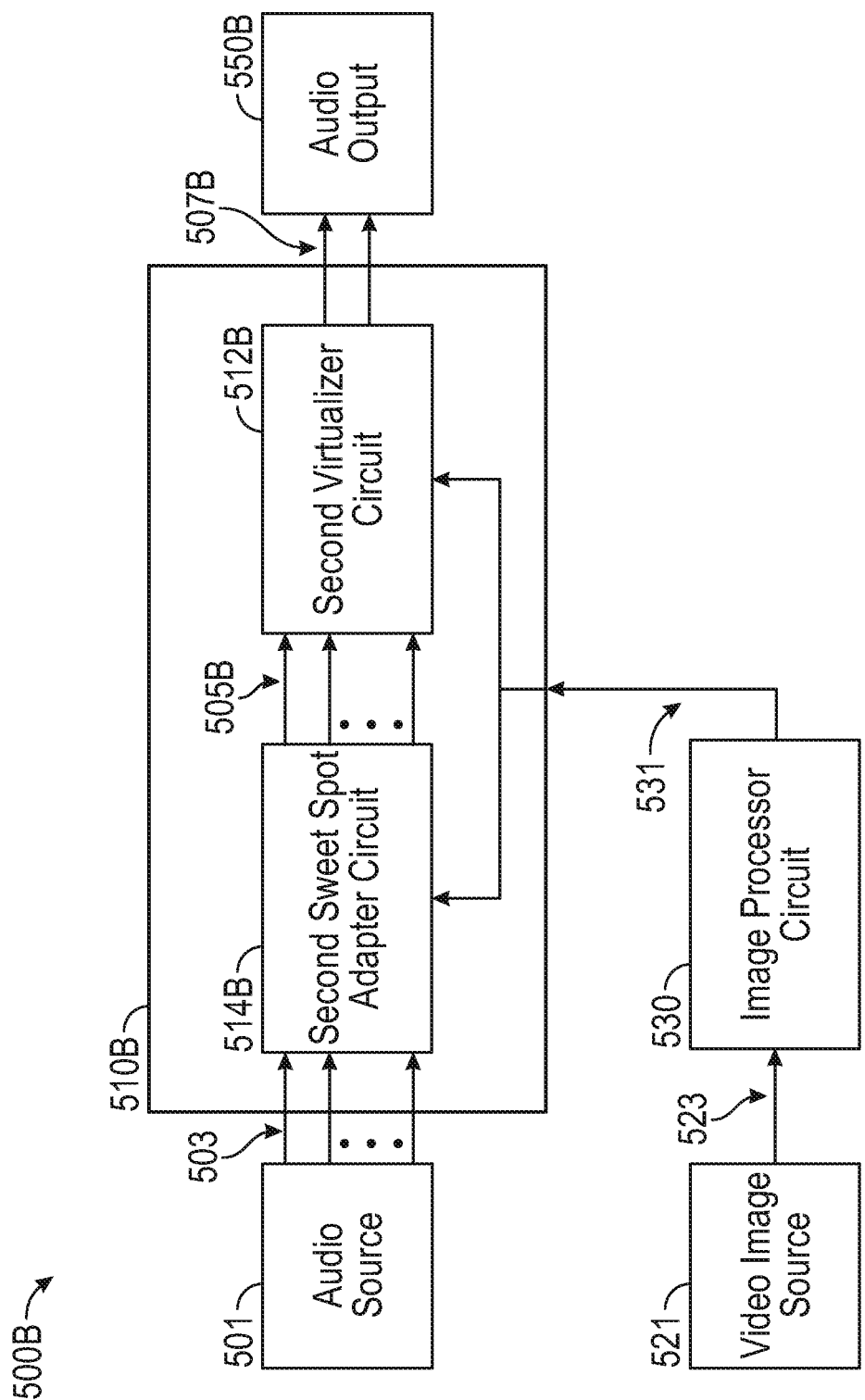
FIG. 5B illustrates generally an example of a block diagram of a second system that includes a virtualizer circuit and a sweet spot adapter circuit.
Figure 6:
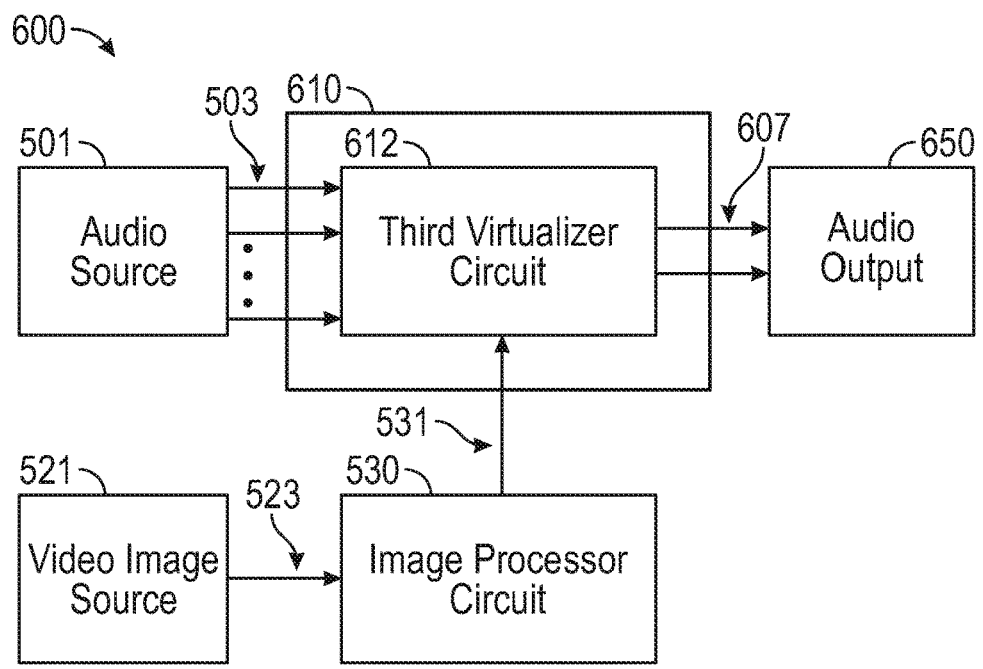
FIG. 6 illustrates generally an example of a block diagram of a third system that includes an adaptable virtualizer circuit.

FIGS. 5A, 5B, and 6 illustrate generally various block diagrams showing systems that can be used to perform virtualization processing using information about a listener position, such as using information from a camera or other listener position sensor. FIG. 5A illustrates generally an example of a block diagram of a first system 500A that includes a first virtualizer circuit 512A and a first sweet spot adapter circuit 514A. In the example of FIG. 5A, the first virtualizer circuit 512A and the first sweet spot adapter circuit 514A comprise portions of a first audio processor circuit 510A.

FIG. 5A includes an audio source 501 that provides one or more audio input signals 503. In an example, the audio input signals 503 comprise a multi-channel audio file, audio stream, object-based audio program, or other signal or signals, such as can be suitable for listening using loudspeakers, headphones, or the like. The audio input signals 503 are provided to the first audio processor circuit 510A.

FIG. 5A further includes a video image source 521. In an example, the video image source 521 includes an optical or visual sensor such as the camera 301 from the examples of FIGS. 3 and 4. In an example, the video image source 521 includes a depth sensor. The video image source 521 can provide an image signal 523 to an image processor circuit 530. In an example that includes the video image source 521 being a depth sensor, the image signal 523 can include one or a combination of distance information and sensed or detected feature (e.g., listener facial feature) information. The image processor circuit 530 can be configured to analyze the image signal 523 to determine a position of a listener, or determine an estimate of a position of a listener in a listening environment. In an example, the image processor circuit 530 is configured to determine coordinates in the listening environment corresponding to a position of the listener. That is, the image processor circuit 530 can determine or provide information about a distance from the video image source 521 (e.g., camera 301, depth sensor, etc.) to the listener.

In some examples, the image processor circuit 530 is configured to determine a characteristic or feature of the listener, such as including information about the listener's head orientation. The head orientation can include information about one or more the listener's head yaw, head pitch, or head roll (see, e.g., FIG. 9). In an example, the image processor circuit 530 is configured to determine a location of one or more of the listener's facial features or other head features, such as a location or coordinates for the listener's ears, mouth, eyes, or other feature.

The image processor circuit 530 can provide information about the listener position or listener orientation as a listener location signal 531 to the first audio processor circuit 510A. The listener location signal 531 can be provided to the first sweet spot adapter circuit 514A, or to the first virtualizer circuit 512A, or to both the first sweet spot adapter circuit 514A and the first virtualizer circuit 512A.

In an example, the audio input signals 503 are received by the first virtualizer circuit 512A in the first audio processor circuit 510A. The first virtualizer circuit 512A is configured to apply virtualization processing to one or more of the audio input signals 503 to provide intermediate audio output signals 505A. In one example, the first virtualizer circuit 512A applies one or more virtualization filters based on a reference sweet spot or based on other information or considerations specific to the listening environment. In such example, the first virtualizer circuit 512A does not use the listener location signal 531 to influence its processing of the audio input signals 503. Instead, the first sweet spot adapter circuit 514A receives the listener location signal 531 and, based on the listener location signal 531 (e.g., a signal indicating or including information about a location of a listener relative to one or more loudspeakers in the listener's environment), the first sweet spot adapter circuit 514A selects one or more filters for processing the intermediate audio output signals 505A received from the first virtualizer circuit 512A. The first sweet spot adapter circuit 514A then renders or provides audio output signals 507A that can be reproduced using the audio output 550A. In an example, the first sweet spot adapter circuit 514A applies gain or attenuation to one or more of the intermediate audio output signals 505A to provide the audio output signals 507A. The gain or attenuation can be applied to specific frequencies or frequency bands. In an example, the first sweet spot adapter circuit 514A applies a delay to one or more of the intermediate audio output signals 505A to provide the audio output signals 507A.

In another example, the first virtualizer circuit 512A applies one or more virtualization filters based, at least in part, on the listener location signal 531 from the image processor circuit 530. That is, one or more filters used by the first virtualizer circuit 512A to process the audio input signals 503 can be selected based on information about the listener position from the listener location signal 531. The first sweet spot adapter circuit 514A can also receive the listener location signal 531 and, based on the listener location signal 531 (e.g., a signal indicating or including information about a location of a listener relative to one or more loudspeakers in the listener's environment), select one or more filters for processing the intermediate audio output signals 505A received from the first virtualizer circuit 512A.

As shown in FIG. 5A, the first audio processor circuit 510A receives a multi-channel audio file or audio stream and produces a binaural loudspeaker signal that is suitable for loudspeaker listening. A listener position estimation module, such as comprising the image processor circuit 530, takes visual information as an input and determines or estimates a listener's position, and encodes that position information in the listener location signal 531. In an example, the image processor circuit 530 provides the listener location signal 531 based on a determined position and/or size of the face and/or positions of the listener's eyes. The listener position information can include an azimuth angle (e.g., an angle between the image center and a projected face center in a horizontal plane) and a distance (e.g., a distance between the video image source 521 and the listener's face center). Other information in the listener location signal 531 can include an elevation angle (e.g., an angle between an image center and a projected face center in a vertical plane), face yaw, pitch, and/or roll angle. To further improve the accuracy of the listener position estimation, the image processor circuit 530 or another processor circuit can perform a classification algorithm to determine one or more of the listener's age and gender and apply a corresponding face width parameter for distance estimation. The first sweet spot adapter circuit 514A calculates the corresponding delay and gain compensation based on the listener's position.

FIG. 5B illustrates generally an example of a block diagram of a second system 500B that includes a second virtualizer circuit 512B and a second sweet spot adapter circuit 514B. In the example of FIG. 5B, the second virtualizer circuit 512B and the second sweet spot adapter circuit 514B comprise portions of a second audio processor circuit 510B.

The second system 500B of FIG. 5B differs from the example of the first system 500A from FIG. 5A in that the second sweet spot adapter circuit 514B receives the audio input signals 503 from the audio source 501, instead of the first virtualizer circuit 512A receiving the audio input signals 503. That is, the second sweet spot adapter circuit 514B can be configured to provide gain and/or delay or other filtering of the audio input signals 503, such as before audio virtualization processing is applied by the second virtualizer circuit 512B. The listener location signal 531 can be provided to the second sweet spot adapter circuit 514B, or to the second virtualizer circuit 512B, or to both the second sweet spot adapter circuit 514B and the second virtualizer circuit 512B. In the example of FIG. 5B, the second virtualizer circuit 512B renders or provides audio output signals 507B that can be reproduced using an audio output 550B.

FIG. 6 illustrates generally an example of a block diagram of a third system 600 that includes a third virtualizer circuit 612. In the example of FIG. 6, the third virtualizer circuit 612 comprises at least a portion of a third audio processor circuit 610. FIG. 6 includes the audio source 501 that provides the one or more audio input signals 503. The audio input signals 503 are provided to the third audio processor circuit 610.

FIG. 6 further includes the video image source 521 configured to provide the image signal 523 to the image processor circuit 530, and the image processor circuit is configured to analyze the image signal 523 to determine a position of a listener, or determine an estimate of a position of a listener in a listening environment. The image processor circuit 530 can provide information about the listener position or listener orientation as the listener location signal 531 to the third audio processor circuit 610. The listener location signal 531 can be provided to the third virtualizer circuit 612.

In an example, the audio input signals 503 are received by the third virtualizer circuit 612 in the third audio processor circuit 610. The third virtualizer circuit 612 is configured to apply virtualization processing to one or more of the audio input signals 503 to provide audio output signals 607. In an example, the third virtualizer circuit 612 applies one or more virtualization filters based, at least in part, on the listener location signal 531 from the image processor circuit 530. That is, one or more filters used by the third virtualizer circuit 612 to process the audio input signals 503 can be selected based on information about the listener position from the listener location signal 531.

In an example, the video image source 521 feeds the image signal 523 to the image processor circuit 530 on a continuous, regular, or intermittent basis. The image processor circuit 530 can correspondingly generate an updated version of the listener location signal 531. That is, the image processor circuit 530 can update or adjust the listener location signal 531 based on changes in the image signal 523. In the example of FIG. 6, the third virtualizer circuit 612 can receive an updated or adjusted listener location signal 531 and determine whether to update or adjust one or more of the virtualization filters used to generate the audio output signals 607.

In an example, any one or more of the systems of FIGS. 5A, 5B, and/or 6 can include or use a user interface. The user interface can be configured to provide visual feedback to the listener or other user about a working status of the system. For example, the user interface can be configured to display an estimate of the listener's location relative to the sweet spot. User interface features and examples are further discussed below.

In an example, implementation of 3D audio virtualization over loudspeakers includes or uses a binaural synthesizer and a crosstalk canceller. When an input signal is already binaurally rendered, such as for headphone listening, the binaural synthesizer step can be bypassed. Both the binaural synthesizer and the crosstalk canceller can use head related transfer functions (HRTFs). An HRTF is a frequency domain representation of HRIR (head related impulse response). HRTFs represent acoustic transformations of a sound source propagating from a location in 3D space to the listener's ears. Such a transformation can capture diffraction of sound due to, among other things, physical characteristics of the listener's head, torso, and pinna. HRTFs can generally be provided in pairs of filters, such as including one for a left ear, and one for a right ear.

In binaural synthesis, a sound source is convolved with a pair of HRIRs to synthesize the binaural signal received at the listener's ears. In the frequency domain, the binaural signal received at the listener's ears can be expressed as, $$\begin{bmatrix} B_L \\ B_R \end{bmatrix} = \begin{bmatrix} H_L \\ H_R \end{bmatrix} S.$$

Figure 7:
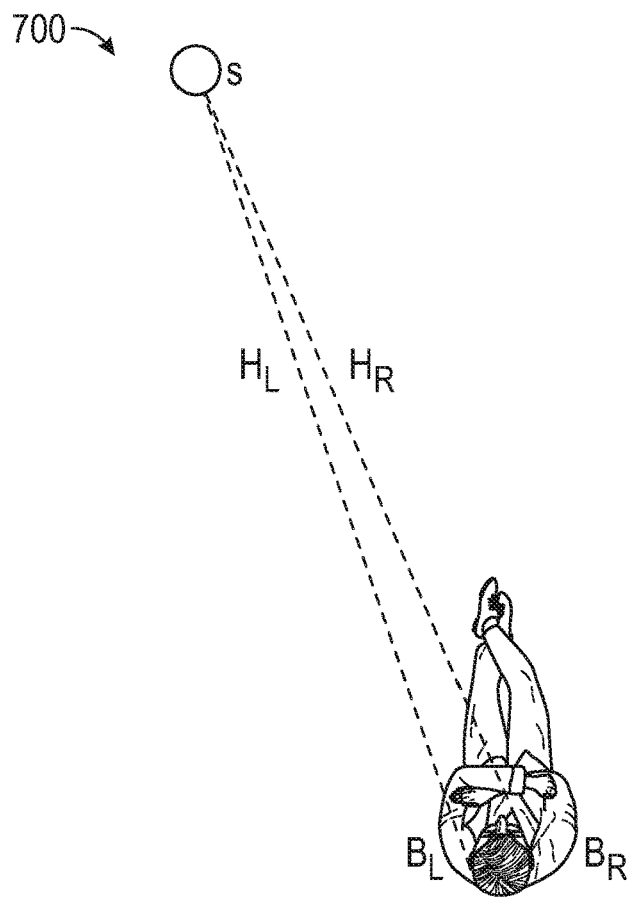
FIG. 7 illustrates generally an example of binaural synthesis of a three-dimensional sound source using HRTFs.

FIG. 7 illustrates generally an example of binaural synthesis of a three-dimensional sound source using HRTFs. In the example of FIG. 7, S denotes the sound source, $H_L$ is an HRTF for the listener's left ear, $H_R$ is an HRTF for the listener's right ear, $B_L$ refers to a binaural signal received at the left ear, and $B_R$ denotes a binaural signal received at the right ear. When there are multiple sound sources available at the same time, each sound source can be convolved with the associated pair of HRTFs. The resulting signals can be summed to synthesize the binaural signal received at the listener's ears. The resulting binaural signal can be suitable for headphone listening. In an example, various signal shaping or frequency response compensation can be applied to remove any undesirable transformation due to a headphone transducer.

In an example, to achieve 3D audio virtualization over two loudspeakers in a listening environment, an additional step is used to remove crosstalk from the left loudspeaker to the listener's right ear and from the right speaker to the listener's left ear.

Figure 8:
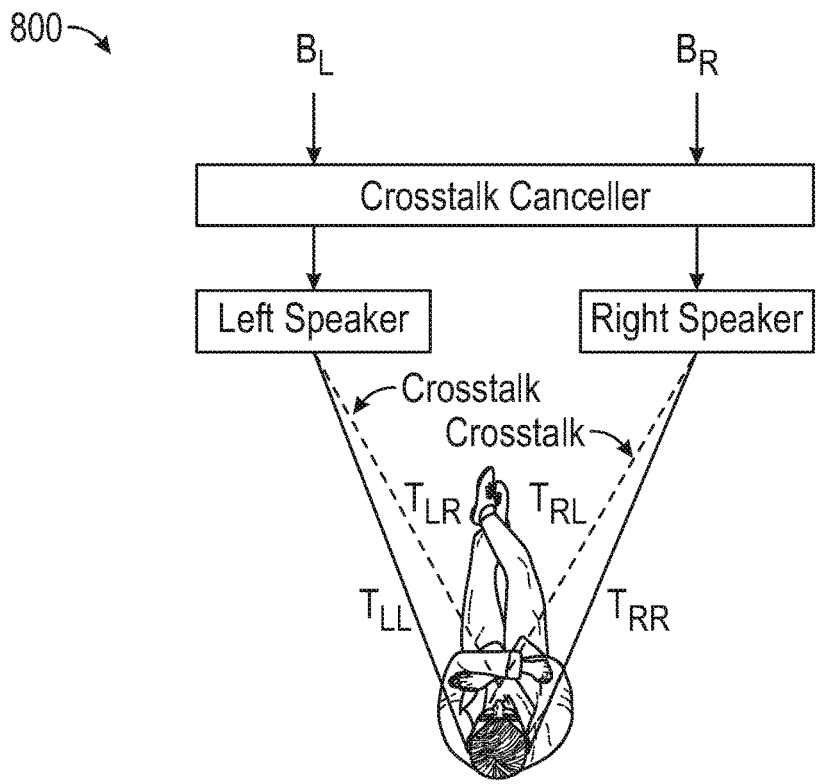
FIG. 8 illustrates generally an example of three-dimensional sound virtualization using a crosstalk canceller.

FIG. 8 illustrates generally an example of three-dimensional sound virtualization using a crosstalk canceller. In the example of FIG. 8, $T_{LL}$ represents a transfer function from the left speaker to the left ear, $T_{LR}$ denotes a transfer function from the left speaker to the right ear, $T_{RL}$ represents a transfer function from the right speaker to the left ear, $T_{RR}$ is a transfer function from the right speaker to the right ear, $B_L$ is a left binaural signal, and $B_R$ is a right binaural signal.

In the example of FIG. 8, a crosstalk canceller is applied to the output of the binaural synthesizer ($B_L$ and $B_R$). The crosstalk canceller output signals are sent to the left and right side loudspeakers for playback. In an example, a crosstalk canceller C can be implemented as the inverse of the acoustic transfer matrix T such that the signals received at the listener's ears are exactly $B_L$ and $B_R$. That is, $$C = T^{-1} = \begin{bmatrix} T_{LL} & T_{RL} \\ T_{LR} & T_{RR} \end{bmatrix}^{-1}.$$

Crosstalk cancellation techniques often assume that loudspeakers are placed at symmetric locations with respect to the listener for simplicity. In spatial audio processing, such as using the systems and methods discussed herein, a location at which the listener perceives an optimal 3D audio effect is called the sweet spot (typically coincident with an axis of symmetry between the two loudspeakers). However, 3D audio effects will not be accurate if the listener is outside of the sweet spot, for example because the assumption of symmetry is violated.

Referring now to determination or estimation of a listener position in a listening environment, the image processor circuit 530 discussed herein can, in an example, operate with an assumption that a listener's face width, or a distance between the eyes of the listener, is constant. Listener position information from the image processor circuit 530 can include, in an example, an azimuth angle and a distance from the listener to the camera. Optionally, the listener's position information may also include an elevation angle, head yaw, head pitch, and/or head roll angle. Various different methods can be used to estimate a listener position.

Figure 9:
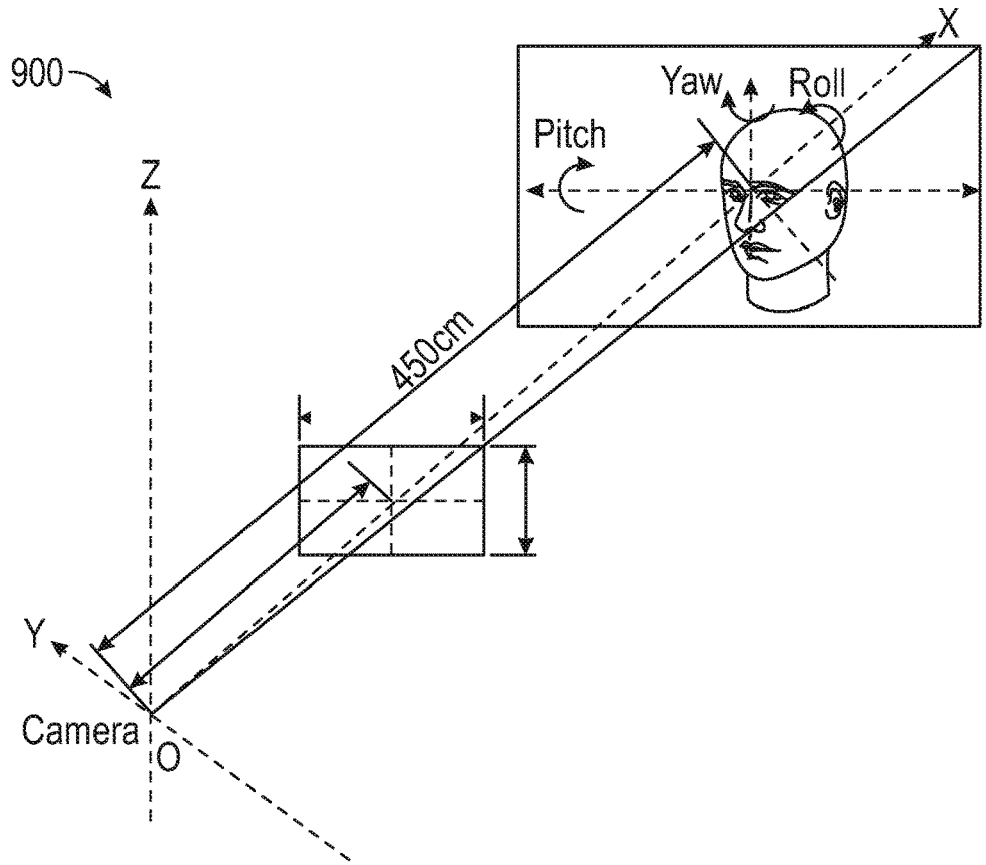
FIG. 9 illustrates generally an example of a method that includes estimating a listener position in a field of a view of a camera.

FIG. 9 illustrates generally an example of a method that includes estimating a listener position in a field of a view of a camera, such as the camera 301 and/or the video image source 521. In the example of FIG. 9, the method can include estimating the listener's distance first and then estimating the listener's azimuth angle and elevation angle based on the estimated distance. This method can be implemented as follows.

First, a machine or computer vision analysis circuit (e.g., the image processor circuit 530) can receive a video input stream (e.g., the image signal 523) from a camera (e.g., the camera 301 and/or the video image source 521) and, in response, provide or determine a face rectangle and/or information about a position of one or both eyes of a listener, such as using a first algorithm. The first algorithm can optionally use a distortion correction module before or after detecting the face rectangle, such as based on intrinsic parameters of the image source (e.g., of the camera or lens) to improve a precision of listener position estimation.

The machine or computer vision analysis circuit (e.g., the image processor circuit 530) can calculate a distance from the image source (e.g., from a depth sensor or camera) to the listener's face center (e.g., in millimeters) using the estimated face rectangle width (e.g., in pixels) or eye distance (e.g., in pixels). The distance calculation can be based on camera hardware parameters or experimental calibration parameters, among other things, for example using an assumption that a face width or distance between eyes is constant. In an example, an eye distance and/or head width can be assumed to have a fixed or reference value for most listeners, or for listeners most likely to be detected by the system. For example, most adult heads are about 14 cm in diameter, and most eyes are about 5 cm apart. These reference dimensions can be used to detect or correct information about a listener's orientation relative to the depth sensor or camera, for example, as a precursor to determining the listener's distance from the sensor. In other words, the system can be configured to first determine a listener's head orientation and then use the head orientation information to determine a distance from the sensor to the listener.

In an example, an eye distance, or interpupillary distance, can be assumed to be about 5 cm for a forward-facing listener. The interpupillary distance assumption can be adjusted based on, for example, an age or gender detection algorithm. The interpupillary distance corresponds to a certain width in pixels in a received image, such as can be converted to an angle using eye positions in the image, the camera's field of view, and formulas presented herein for the similar 'face width' algorithm. In this example, the angle value corresponds to a particular distance from the camera. Once a reference measurement is made (e.g., a reference distance to a listener in millimeters and corresponding interpupillary distance in pixels, such as converted to radians), a distance to the listener can be determined using a later-detected interpupillary distance, such as for the same or different forward-facing listener.

For a listener who may be facing a direction other than forward (e.g., at an angle relative to the camera), information from a head-orientation tracking algorithm (e.g., configured to detect or determine head yaw, roll and/or pitch angles) can be used to rotate a detected eye center position on a sphere of, for example, 143 millimeters diameter for an adult face. As similarly explained above for interpupillary distance, the assumed or reference head diameter can be changed according to, for example, the listener's age or gender. By rotating the detected eye center about the hypothetical sphere, corrected or corresponding forward-facing eye positions can be calculated.

Following the distance calculation, an optional classification algorithm can be used to enhance or improve accuracy of the position or distance estimation. For example, the classification algorithm can be configured to determine an age and/or gender of the listener and apply a corresponding face width parameter or eye distance parameter.

Next, with knowledge of the face image center in pixels (e.g., image_width/2, image_height/2) and the face center in pixels, the method can include calculating horizontal and vertical distances in the face plane in pixels. Assuming a constant adult face width (e.g., about 143 millimeters) and its detected size in pixels, the distances can be converted to millimeters, for example using:

distance (mm)=distance (pixels)*face_width (mm)/ face_width (pixels).

Using the two distance values, the method can continue by calculating a diagonal distance from the image center to the face center. Now with a known distance from the camera to the listener's face and distance from the image center to the listener's face, the Pythagorean theorem can be used to calculate a distance to the face plane.

Next, an azimuth angle can be calculated. The azimuth angle is an angle between a center line of the face plane and a projection of the distance to the face in the horizontal plane. The azimuth angle can be calculated as the arctangent between the center line and the horizontal distance between the image center and the face position.

An elevation angle can similarly be determined. The elevation angle is an angle between a line from the camera to the face center and its projection to the horizontal plane across the image center. The elevation angle can be calculated as the arcsine of the ratio between the vertical distance and the listener distance.

Finally, an estimated listener position can be optionally filtered by applying hysteresis to reduce any undesirable fluctuations or abrupt changes in listener position.

In an example, another method for estimating a listener position in a listening environment includes determining the listener's distance and angle independently. This method uses information about the camera's field of view (FOV), such as can be obtained during a calibration activity.

Figure 10:
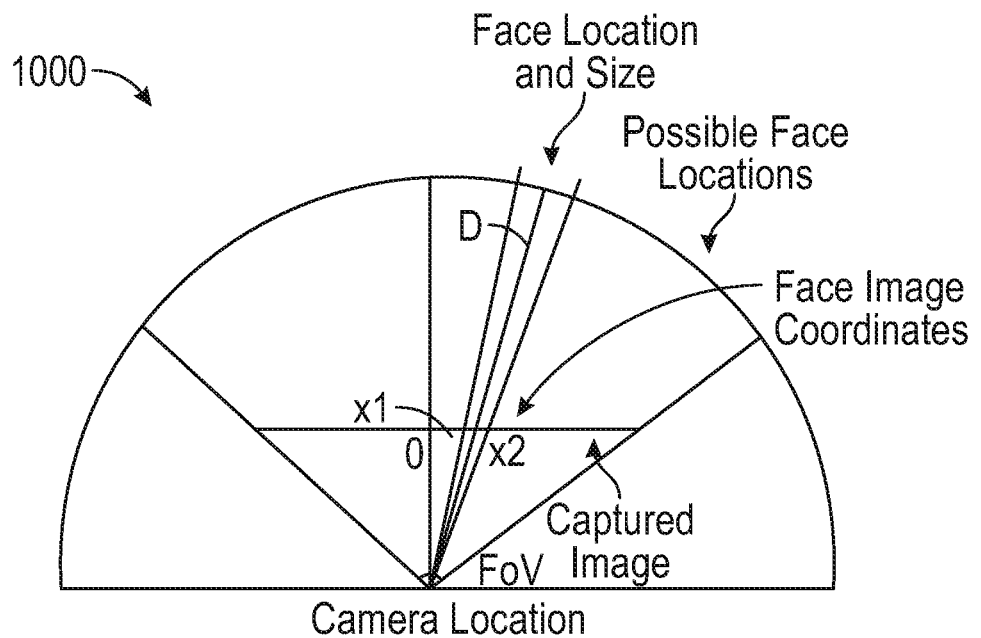
FIG. 10 illustrates generally an example of a listener face location relative to its projection on an image captured by a camera.

FIG. 10 illustrates generally an example 1000 of a listener face location relative to its projection on an image captured by a camera. A listener face moving in an environment, facing a camera and maintaining a relatively constant or unchanging distance relative to the camera, can approximately describe a sphere. Taking horizontal and vertical movements independently, the face can describe a circle on the horizontal axis and a circle on the vertical axis. Since the camera can only see in a certain or fixed field of view, only a portion of the circle may be visible to the camera. The visible portion is referred to generally as the field of view, or field of vision (FOV). The real scene is projected on the camera sensor through the camera's lens, for example following lines that pass through the image projection toward a center where the lines converge. With this insight, an angle, relative to the image center of each pixel in the image, can be recovered and expressed in radians, such as instead of pixels. In the example 1000, x1 and x2 represent locations of corners or edges of a listener's face, and D represents a distance to the camera.

Figure 11:
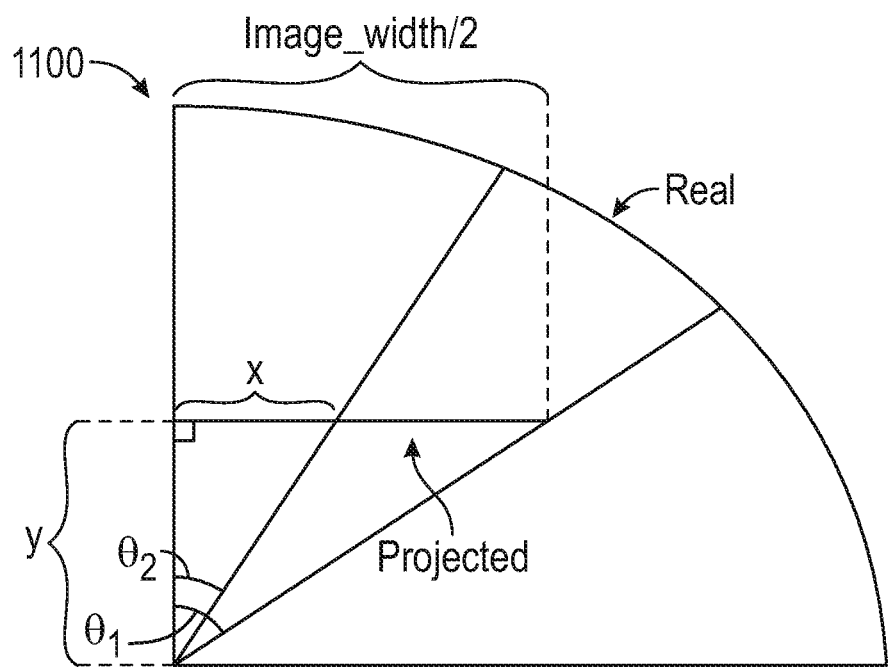
FIG. 11 illustrates generally an example of determining image coordinates.

FIG. 11 illustrates generally an example 1100 of determining image coordinates. The example 1100 can include determining or recovering an angle for any image coordinate in the camera's field of view. In the example of FIG. 11, x indicates a position in an image that is to be estimated as an angle, and y indicates a calculated value from the image width and field of view that can be used to estimate any value x. The angle $\theta_1$ indicates half of the camera's field of view, and the angle $\theta_2$ indicates a desired angle value to determine, such as corresponding to x. The listener's azimuth angle (x_in_radians) can thus be calculated as, $$y = \frac{\frac{\text{image\_width}}{2}}{\tan\left(\frac{\text{Horizontal\_FOV}}{2} * \frac{\pi}{180}\right)}$$

$$x\_in\_radians = \tan^{-1}\left(\frac{x\_in\_pixels}{y}\right).$$

During a calibration event, a reference face distance to the camera (d_ref) can be measured and a corresponding reference face width in radians (w_ref) can be recorded. Using the reference values, for any face in the scene, a face width can be converted to radians (w_est) and the distance to camera d can be calculated as, $$d = d\_ref * w\_ref / w\_est.$$

In an example, if the horizontal FOV and the image size are known, then the vertical FOV can be calculated as, $$\text{Vertical\_FOV} = \frac{\text{Horizontal\_FOV}}{\text{Image\_Width}} * \text{Image\_Height}$$

The elevation angle in radians (e_in_radians) can be similarly calculated as, $$y = \frac{\frac{\text{image\_height}}{2}}{\tan\left(\frac{\text{Vertical\_FOV}}{2} * \frac{\pi}{180}\right)}$$

$$e\_in\_radians = \tan^{-1}\left(\frac{e\_in\_pixels}{y}\right).$$

Sweet spot adaptation, according to the systems and methods discussed herein, can be performed using one or a combination of virtualizer circuits and sweet spot adapter circuits, such as by applying delay and/or gain compensation to audio signals. In an example, a sweet spot adapter circuit applies delay and/or gain compensation to audio signals output from the virtualizer circuit, and the sweet spot adapter circuit applies a specified amount of delay and/or based on information about a listener position or orientation. In an example, a virtualizer circuit applies one or more different virtualization filters, such as HRTFs, and the one or more virtualization filters are selected based on information about a listener position or orientation. In an example, the virtualizer circuit and the sweet spot adapter circuit can be adjusted or configured to work together to realize appropriate audio virtualization for sweet spot adaptation or relocation in a listening environment.

Delay and gain compensation can be performed using a distance between the listener and two or more speakers used for playback of virtualized audio signals. The distance can be calculated using information about the listener's position relative to a camera and using information about a position of the loudspeakers relative to the camera. In an example, an image processor circuit can be configured to estimate or provide information about a listener's azimuth angle relative to the camera and/or to the loudspeaker, a distance from the listener to the camera, an elevation angle, and face yaw angle, face pitch angle, and/or roll angle relative to a reference plane or line.

Figure 12:
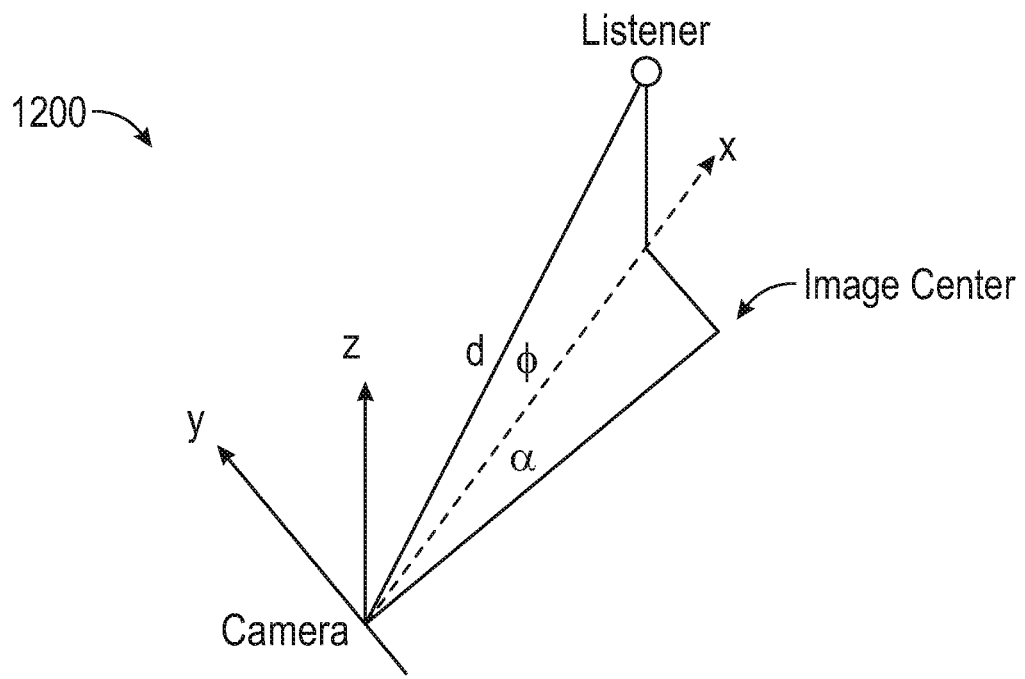
FIG. 12 illustrates generally an example of determining coordinates of a listener in a field of view of a camera.

FIG. 12 illustrates generally an example 1200 of determining coordinates of a listener in a field of view of a camera. For example, cartesian coordinates of a listener relative to a camera can be provided. In the example of FIG. 12, a position of the camera be the origin of the coordinate system. In this case, cartesian coordinates of the listener can be calculated using, $$x = d \cos(\phi)\cos(\alpha)$$

$$y = d \cos(\phi)\sin(\alpha)$$

$$z = d \sin(\phi),$$

where d is an estimated distance between the camera and the listener, α is an azimuth angle, and ϕ is an elevation angle.

In an example, coordinates of the left speaker and right speaker can be $[x_l\, y_l\, z_l]$ and $[x_r\, y_r\, z_r]$ respectively. A distance between the listener and the two loudspeakers can then be calculated as, $$d_l = \sqrt{(x-x_l)^2 + (y-y_l)^2 + (z-z_l)^2}$$

$$d_r = \sqrt{(x-x_r)^2 + (y-y_r)^2 + (z-z_r)^2}.$$

A delay in samples (D) can be calculated as $$D = (d_l - d_r) * \frac{\text{sampling rate}}{C},$$

such as where C is the speed of sound in air (approximately 343 m/s at room temperature). If D is positive, then a delay is applied to the right channel. Otherwise, the delay is applied to the left channel.

In an example, gain compensation can be applied to one or more audio signals or channels, such as additionally or alternatively to delay. In an example, gain compensation can be based on a distance difference between the two loudspeakers. For example, a gain in dB can be calculated as, $$\text{gain} = 20 * \log_{10}(d_l/d_r).$$

To preserve an overall sound level, a gain of a more distant speaker relative to the listener can increased while the gain of a nearer speaker can be decreased. In such case, an applied gain can be about half of the calculated gain value.

Figure 13:
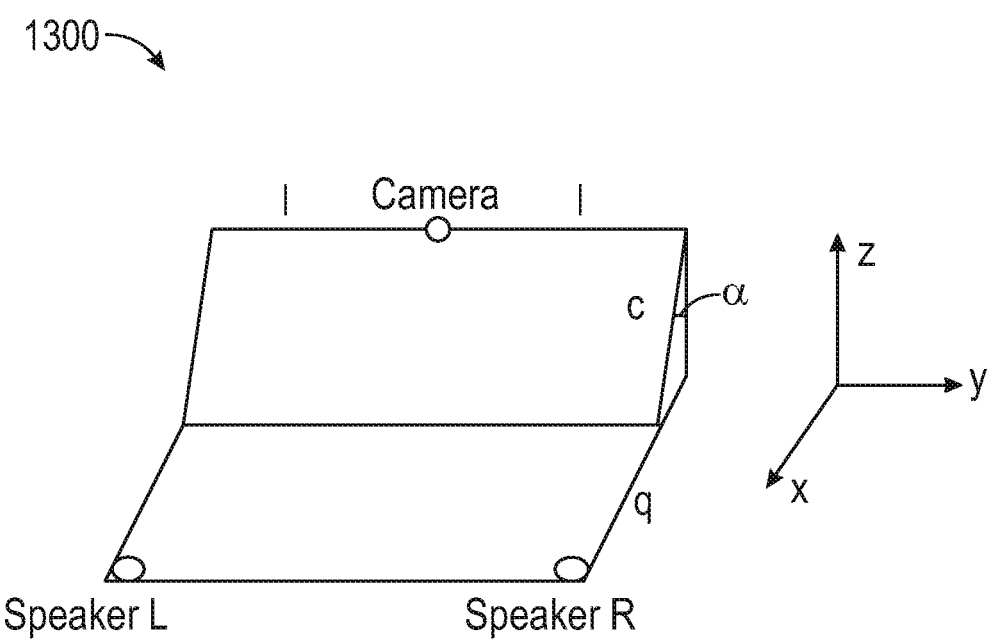
FIG. 13 illustrates generally an example of a relationship between a camera and a loudspeaker for a laptop computer.

FIG. 13 illustrates generally an example 1300 of a relationship between a camera and a loudspeaker for a laptop computer. In the example of FIG. 13, left and right loudspeakers (Speaker L and Speaker R) fixed to the laptop computer can have a different axis than a camera fixed to the same laptop computer. Additionally, a screen angle of the laptop computer is typically not exactly 90 degrees. Referring to FIG. 13, if a position of the camera is considered the origin of a coordinate system, then the position of the left speaker, Speaker L, can be expressed as, $$x = c \sin(\alpha) + q$$

$$y = -l$$

$$z = -c \cos(\alpha).$$

Similarly, a position of the right speaker, Speaker R, can be expressed as $x = c\sin(\alpha) + q$ $y = l$ $z = -c\cos(\alpha).$ In an example, when q is 0 and c is 0, then positions of the left and right speakers are [x=0,y=−l,z=0] and [x=0,y=l, z=0], respectively. In this case, the two speakers are coincident with they axis. Such an orientation can be typical in, for example, implementations that include or use a sound bar (see, e.g., the example of FIG. 4).

In an example, when q is 0 and α is 0, then positions of the left and right speakers are [x=0,y=−l,z=−c] and [x=0, y=l,z=−c], respectively. In this case, the two speakers are on they-z plane. Such an orientation can be typical in, for example, implementations that include a TV (see, e.g., the examples of FIGS. 1-3).

Due to a variable screen angle of a laptop computer, however, a pitch angle of the camera may not be identically 0. That is, the camera may not face, or be coincident with, the x-axis direction. Thus, a detected listener position can be adjusted before computing a distance between the listener and the two speakers. The listener's position can be rotated by the camera pitch angle in the x-z plane so that the camera faces the x-axis direction. For example, the adjusted listener position can be expressed as $x' = \cos(\alpha)x - \sin(\alpha)z$ $y' = y$ $z' = \sin(\alpha)x + \cos(\alpha)z.$ After the listener position is adjusted, a distance from the listener to each speaker can be calculated.

As discussed earlier, it can be beneficial to a user experience to filter delay and gain parameters to accommodate various changes or fluctuations in a determined listener position. That is, it can be beneficial to the listener experience to filter an estimated delay value ($D_{est}$) and/or an estimated gain value ($G_{est}$) to reduce unintended audio fluctuations. An efficient approach is to apply a running average filter, for example, $D_{next} = (1-\alpha)D_{prev} + \alpha D_{est}$ $G_{next} = (1-\alpha)G_{prev} + \alpha G_{est}$ Where α is a smoothing constant between 0 and 1, $D_{next}$ and $G_{est}$ are subsequent or next delay and gain values, and $D_{prev}$ and $G_{prev}$ are previous delay and gain values. Alternative approaches for smoothing such as median filtering can additionally or alternatively be used.

In an example, a user interface can be configured to receive information from one or more of a video image source (e.g., a camera), an image processor circuit, or an audio processor circuit, such as including a virtualizer circuit or a sweet spot adapter circuit. The user interface can be configured to provide information or feedback, such as to the listener, to indicate an operating status of the video image source (e.g., of the camera) and/or audio processor circuit.

For example, the video image source can include a camera with a limited field of view. When the listener is out of the camera's field of view, it can be helpful to provide an indication or warning to the listener using the UI, such as to indicate that the listener should move to a position within the camera's field of view in order to enable virtualization processing that accommodates the listener's actual position in the listening environment and in the field of view. In an example, the UI can display text or images on a screen to indicate a status of a listener position tracker, for example including information about a listener location signal from an image processor circuit. Other examples can include displaying video or still images or other information extracted from the video image source, such as with an indication of one or more available sweet spots in the listening environment. The UI can also be used to indicate to a listener when the camera is out of focus or unable to adequately focus.

Alternate embodiments of the 3D sweet spot adaptation systems and methods discussed herein are possible. Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines, circuits, and computing systems that can function together. For example, audio virtualization and sweet spot adaptation can be performed using discrete circuits or systems, or can be performed using a common, general purpose processor.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document. Embodiments of the sweet spot adaptation and image processing methods and techniques described herein are operational within numerous types of general purpose or special purpose computing system environments or configurations, such as described in the discussion of FIG. 14.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Further, one or any combination of software, programs, or computer program products that embody some or all of the various examples of the virtualization and/or sweet spot adaptation described herein, or portions thereof, may be stored, received, transmitted, or read from any desired combination of computer or machine readable media or storage devices and communication media in the form of computer executable instructions or other data structures. Although the present subject matter is described in language specific to structural features and methodological acts, it is to be understood that the subject matter defined in the appended claims is not necessarily limited to the specific features or acts described herein. Rather, the specific features and acts described above are disclosed as example forms of implementing the claims.

Various systems and machines can be configured to perform or carry out one or more of the signal processing tasks described herein, including but not limited to listener position or orientation determination or estimation using information from a sensor or image, audio virtualization processing such as using HRTFs, and/or audio signal processing for sweet spot adaptation such as using gain and/or delay filtering of one or more signals. Any one or more of the disclosed circuits or processing tasks can be implemented or performed using a general-purpose machine or using a special, purpose-built machine that performs the various processing tasks, such as using instructions retrieved from a tangible, non-transitory, processor-readable medium.

Figure 14:
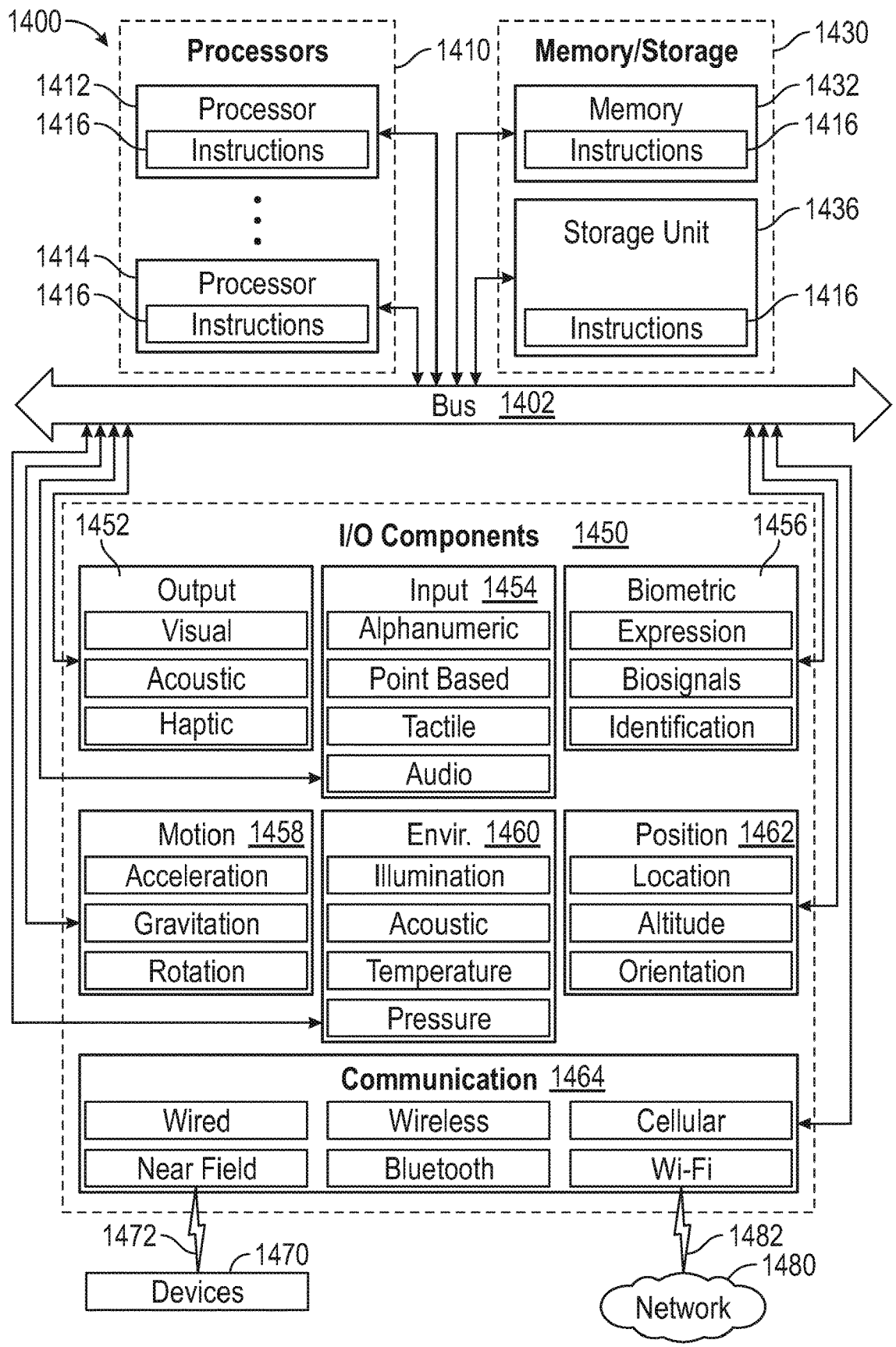
FIG. 14 illustrates generally a block diagram illustrating components of a machine able to read instructions from a machine-readable medium and perform any one or more of the methodologies discussed herein.

FIG. 14 is a block diagram illustrating components of a machine 1400, according to some examples, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which the instructions 1416 (e.g., software, a program, an application, an applet, an app, or other executable code) for causing the machine 1400 to perform any one or more of the methodologies discussed herein may be executed. For example, the instructions 1416 can implement one or more of the modules or circuits or components of FIGS. 5A, 5B, 6, and/or 8, such as can be configured to carry out the audio signal processing and/or image signal processing discussed herein. The instructions 1416 can transform the general, non-programmed machine 1400 into a particular machine programmed to carry out the described and illustrated functions in the manner described (e.g., as an audio processor circuit). In alternative embodiments, the machine 1400 operates as a standalone device or can be coupled (e.g., networked) to other machines. In a networked deployment, the machine 1400 can operate in the capacity of a server machine or a client machine in a server-client network environment, or as a peer machine in a peer-to-peer (or distributed) network environment.

The machine 1400 can comprise, but is not limited to, a server computer, a client computer, a personal computer (PC), a tablet computer, a laptop computer, a netbook, a set-top box (STB), a personal digital assistant (PDA), an entertainment media system or system component, a cellular telephone, a smart phone, a mobile device, a wearable device (e.g., a smart watch), a smart home device (e.g., a smart appliance), other smart devices, a web appliance, a network router, a network switch, a network bridge, a headphone driver, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 can include or use processors 1410, such as including an audio processor circuit, non-transitory memory/storage 1430, and I/O components 1450, which can be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) can include, for example, a circuit such as a processor 1412 and a processor 1414 that may execute the instructions 1416. The term "processor" is intended to include a multi-core processor 1412, 1414 that can comprise two or more independent processors 1412, 1414 (sometimes referred to as "cores") that may execute the instructions 1416 contemporaneously. Although FIG. 14 shows multiple processors 1410, the machine 1400 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiples cores, or any combination thereof, wherein any one or more of the processors can include a circuit configured to encode audio and/or video signal information, or other data.

The memory/storage 1430 can include a memory 1432, such as a main memory circuit, or other memory storage circuit, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the cache memory of processor 1412, 1414), or any suitable combination thereof, during execution thereof by the machine 1400. Accordingly, the memory 1432, the storage unit 1436, and the memory of the processors 1410 are examples of machine-readable media. In an example, the memory/storage 1430 comprises the look-ahead buffer circuit 120 or one or more instances thereof.

As used herein, "machine-readable medium" means a device able to store the instructions 1416 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a variety of components to receive input, provide output, produce output, transmit information, exchange information, capture measurements, and so on. The specific I/O components 1450 that are included in a particular machine 1400 will depend on the type of machine 1400. For example, portable machines such as mobile phones will likely include a touch input device, camera, or other such input mechanisms, while a headless server machine will likely not include such a touch input device. It will be appreciated that the I/O components 1450 may include many other components that are not shown in FIG. 14. The I/O components 1450 are grouped by functionality merely for simplifying the following discussion, and the grouping is in no way limiting. In various example embodiments, the I/O components 1450 may include output components 1452 and input components 1454. The output components 1452 can include visual components (e.g., a display such as a plasma display panel (PDP), a light emitting diode (LED) display, a liquid crystal display (LCD), a projector, or a cathode ray tube (CRT)), acoustic components (e.g., loudspeakers), haptic components (e.g., a vibratory motor, resistance mechanisms), other signal generators, and so forth. The input components 1454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), video input components, and the like.

In further example embodiments, the I/O components 1450 can include biometric components 1456, motion components 1458, environmental components 1460, or position (e.g., position and/or orientation) components 1462, among a wide array of other components. For example, the biometric components 1456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like, such as can influence inclusion, use, or selection of a listener-specific or environment-specific filter. The motion components 1458 can include acceleration sensor components (e.g., accelerometer), gravitation sensor components, rotation sensor components (e.g., gyroscope), and so forth, such as can be used to track changes in a location of a listener, such as can be further considered or used by the processor to update or adjust a sweet spot. The environmental components 1460 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect reverberation decay times, such as for one or more frequencies or frequency bands), proximity sensor or room volume sensing components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 can include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 can include communication components 1464 operable to couple the machine 1400 to a network 1480 or devices 1470 via a coupling 1482 and a coupling 1472 respectively. For example, the communication components 1464 can include a network interface component or other suitable device to interface with the network 1480. In further examples, the communication components 1464 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 can be another machine or any of a wide variety of peripheral devices (e.g., a peripheral device coupled via a USB).

Moreover, the communication components 1464 can detect identifiers or include components operable to detect identifiers. For example, the communication components 1464 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF49, Ultra Code, UCC RSS-2D bar code, and other optical codes), or acoustic detection components (e.g., microphones to identify tagged audio signals). In addition, a variety of information can be derived via the communication components 1464, such as location via Internet Protocol (IP) geolocation, location via Wi-Fi® signal triangulation, location via detecting an NFC beacon signal that may indicate a particular location, and so forth. Such identifiers can be used to determine information about one or more of a reference or local impulse response, reference or local environment characteristic, or a listener-specific characteristic.

In various example embodiments, one or more portions of the network 1480, such as can be used to transmit encoded frame data or frame data to be encoded, can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 can include a wireless or cellular network and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 can be transmitted or received over the network 1480 using a transmission medium via a network interface device (e.g., a network interface component included in the communication components 1464) and using any one of a number of well-known transfer protocols (e.g., hypertext transfer protocol (HTTP)). Similarly, the instructions 1416 can be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Various aspects of the invention can be used independently or together. For example, Aspect 1 can include or use subject matter (such as an apparatus, a system, a device, a method, a means for performing acts, or a device readable medium including instructions that, when performed by the device, can cause the device to perform acts), such as can include or use a method for adjusting one or more received audio signals based on a listener position relative to a speaker to provide a sweet spot at the listener position in a listening environment. Aspect 1 can include receiving a first indication about a listener position using information from a first sensor about the listener position in an environment monitored by the first sensor, and generating, using an audio processor circuit, one or more adjusted audio signals based on (1) the received first indication about the listener position, (2) information about a position of the speaker relative to the first sensor, and (3) the one or more received audio signals.

Aspect 2 can include or use, or can optionally be combined with the subject matter of Aspect 1, to optionally include receiving the first indication about the listener position using information from the first sensor, including receiving information from a camera about the listener position in a field of view of the camera.

Aspect 3 can include or use, or can optionally be combined with the subject matter of one or any combination of Aspects 1 or 2 to optionally include receiving the first indication about the listener position using information from the first sensor, including receiving information from a depth sensor about one or more features of a listener at the listener position in the environment.

Aspect 4 can include or use, or can optionally be combined with the subject matter of one or any combination of Aspects 1 through 3 to optionally include receiving the first indication about the listener position using information from the first sensor, including receiving an indication of a head orientation of the listener, wherein the head orientation of the listener includes an indication of one or more of a head yaw, head pitch, or head roll of the listener, and wherein the generating the one or more adjusted audio signals includes using the indication of the head yaw, head pitch, or head roll of the listener.

Aspect 5 can include or use, or can optionally be combined with the subject matter of Aspect 4, to optionally include determining a distance parameter indicative of a distance from the speaker to each of two ears of the listener based on the received indication of the head orientation of the listener, and wherein generating the one or more adjusted audio signals includes generating at least a pair of audio signals using filters selected to compensate for the distance from the speaker to each of the two ears of the listener.

Aspect 6 can include or use, or can optionally be combined with the subject matter of one or any combination of Aspects 1 through 5 to optionally include the audio processor circuit including a virtualizer circuit and a sweet spot adapter circuit, wherein the virtualizer circuit is configured to receive the one or more received audio signals and generate virtualized audio signals based on a first virtualization filter, and wherein the sweet spot adapter circuit is configured to receive the virtualized audio signals from the virtualizer circuit and provide the one or more adjusted audio signals based on the received first indication about the listener position.

Aspect 7 can include or use, or can optionally be combined with the subject matter of Aspect 6, to optionally include the sweet spot adapter circuit configured to apply a gain and/or a delay to at least one audio signal channel of the received virtualized audio signals, wherein the gain and/or delay is based on the received first indication about the listener position.

Aspect 8 can include or use, or can optionally be combined with the subject matter of one or any combination of Aspects 1 through 5 to optionally include the audio processor circuit including a virtualizer circuit and a sweet spot adapter circuit, wherein the sweet spot adapter circuit is configured to receive the one or more received audio signals and provide an intermediate audio output, and wherein the virtualizer circuit is configured to receive the intermediate audio output from the sweet spot adapter circuit and generate the adjusted audio signals based on the received first indication about the listener position.

Aspect 9 can include or use, or can optionally be combined with the subject matter of one or any combination of Aspects 1 through 8 to optionally include the audio processor circuit including a virtualizer circuit, and wherein the virtualizer circuit is configured to receive the one or more received audio signals and apply virtualization processing to the received one or more audio signals to generate the adjusted audio signals.

Aspect 10 can include or use, or can optionally be combined with the subject matter of Aspect 9, to optionally include the virtualizer circuit is configured to select, based on the received first indication about the listener position, a first virtualization filter to apply to the received one or more audio signals to generate the adjusted audio signals. In Aspect 10, the first virtualization filter can be selected from among multiple available virtualization filters in a memory circuit. In Aspect 10, the first virtualization filter can be determined, using the virtualizer circuit or another processor circuit, based on a mathematical model using the first indication about the listener position as an input to the model. In Aspect 10, the first virtualization filter can be determined using interpolation of multiple other filters.

Aspect 11 can include or use, or can optionally be combined with the subject matter of one or any combination of Aspects 9 or 10 to optionally include, receiving a subsequent second indication about a listener position using information from the first sensor about the listener in the environment monitored by the first sensor, and generating, using the audio processor circuit, the one or more adjusted audio signals based on a different second virtualization filter, wherein the virtualizer circuit is configured to select the different second virtualization filter based on the received subsequent second indication about the listener position.

Aspect 12 can include or use, or can optionally be combined with the subject matter of one or any combination of Aspects 1 through 11 to optionally include receiving the first indication about the listener position using information from the first sensor includes, using an image processing circuit: determining a face width of the listener relative to a reference face width, and providing an indication of a distance from the first sensor to a head position of the listener using the determined face width of the listener. In Aspect 12, generating the one or more adjusted audio signals based on the received first indication about the listener position can include using the indication of the distance from the first sensor to the head position of the listener.

Aspect 13 can include or use, or can optionally be combined with the subject matter of one or any combination of Aspects 1 through 12 to optionally include, receiving the first indication about the listener position using information from the first sensor including using an image processing circuit for determining an interpupillary distance of the listener relative to a reference distance, and determining a head orientation of the listener. Aspect 13 can include providing an indication of a distance from the first sensor to a head position of the listener using the determined interpupillary distance and head orientation of the listener, and Aspect 13 can include generating the one or more adjusted audio signals based on the received first indication about the listener position including using the indication of the distance from the first sensor to the head position of the listener.

Aspect 14 can include or use subject matter (such as an apparatus, a system, a device, a method, a means for performing acts, or a device readable medium including instructions that, when performed by the device, can cause the device to perform acts), such as can include or use a system for adjusting one or more input audio signals based on a listener position relative to a speaker, such as can include or one or more of the Aspects 1 through 13 alone or in various combinations. In an example, Aspect 14 includes a system comprising a first sensor configured to receive a first indication about a listener position in a listening environment monitored by the first sensor, and an audio processor circuit configured to generate one or more adjusted audio signals based on (1) the received first indication about the listener position from the first sensor, (2) information about a position of the speaker relative to the camera, and (3) the one or more received audio signals.

Aspect 15 can include or use, or can optionally be combined with the subject matter of Aspect 14 to optionally include an image processor circuit coupled to the first sensor, the image processor circuit configured to receive, from the first sensor, image or depth information about the listening environment including the first indication about the listener position. In Aspect 15, the image processor circuit can be configured to determine a head orientation of the listener based on the received image information, the head orientation including an indication of one or more of a head yaw, head pitch, or head roll of the listener. In Aspect 15, the audio processor circuit can be configured to generate the one or more adjusted audio signals based on the received first indication about the listener position including using the determined head orientation.

Aspect 16 can include or use, or can optionally be combined with the subject matter of Aspect 15, to optionally include at least one of the image processor circuit and the audio processor circuit being further configured to determine a distance parameter indicative of a distance from the speaker to each of two ears of the listener based on the indication of the one or more of the head yaw, head pitch, or head roll of the listener.

Aspect 17 can include or use, or can optionally be combined with the subject matter of one or any combination of Aspects 14 through 16 to optionally include the audio processor circuit comprising an audio input configured to receive the one or more input audio signals, and a virtualizer circuit coupled to the audio input and configured to use a virtualization filter to generate virtualized audio signals corresponding to the input audio signals, wherein the virtualization filter corresponds to the received first indication about the listener position from the first sensor. Aspect 17 can include a sweet spot adapter circuit configured to apply a gain and/or a delay to one or more of the virtualized audio signals to provide adjusted audio signals. Aspect 17 can further include an audio output configured to provide the adjusted audio signals.

Aspect 18 can include or use, or can optionally be combined with the subject matter of one or any combination of Aspects 14 through 16 to optionally include the audio processor circuit comprising an audio input configured to receive the one or more input audio signals, and a virtualizer circuit coupled to the audio input and configured to use a virtualization filter to generate the one or more adjusted audio signals based on the input audio signals, wherein the virtualization filter is selected by the virtualizer circuit based on the received first indication about the listener position from the first sensor.

Aspect 19 can include or use subject matter (such as an apparatus, a system, a device, a method, a means for performing acts, or a device readable medium including instructions that, when performed by the device, can cause the device to perform acts), such as can include or use an apparatus for generating one or more virtualized audio signals for a first listener in an environment based on an input audio signal, such as can include or one or more of the Aspects 1 through 18 alone or in various combinations. In an example, Aspect 19 includes a first sensor with an image processing circuit configured to receive image information from a first field of view of the first sensor and determine a distance from the first sensor to the first listener in the first field of view of the first sensor, wherein the image processing circuit is configured to determine the distance using information about one or more of a head yaw, head pitch, or head roll angle of the first listener. Aspect 19 further includes an audio processor circuit configured to generate one or more virtualized audio signals based on (1) the determined distance from the camera to the first listener, (2) information about a position of a loudspeaker relative to the first sensor, and (3) the input audio signal.

Aspect 20 can include or use, or can optionally be combined with the subject matter of Aspect 19 to optionally include the audio processor circuit including a virtualizer circuit and a sweet spot adapter circuit, wherein the virtualizer circuit is configured to generate an intermediate output signal by applying a head-related transfer function (HRTF) filter to the input audio signal, wherein the HRTF filter is selected based on the determined distance from the first sensor to the first listener, and wherein the sweet spot adapter circuit is configured to generate the one or more virtualized audio signals for the first listener in the environment by applying a gain and/or a delay to the intermediate output signal generated by the virtualizer circuit.

Each of these non-limiting Aspects can stand on its own, or can be combined in various permutations or combinations with one or more of the other Aspects or examples provided herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made. As will be recognized, certain embodiments of the inventions described herein can be embodied within a form that does not provide all of the features and benefits set forth herein, as some features can be used or practiced separately from others.

Moreover, although the subject matter has been described in language specific to structural features or methods or acts, it is to be understood that the subject matter defined in the appended claims is not necessarily limited to the specific features or acts described above. Rather, the specific features and acts described above are disclosed as example forms of implementing the claims.

What is claimed is:

1. A method for adjusting one or more received audio signals based on a listener position relative to first and second loudspeakers to provide a listening sweet spot at the listener position in a listening environment, the method comprising:
   receiving calibration information including (a) reference distance information from a reference listener position to a camera and (b) reference width information about a listener head or a listener face at the reference listener position, wherein the reference width information is in a unit of angular measure;
   receiving, from the camera, image information about a listener at the listener position in the listening environment, the image information including characteristic width information about a head or face of the listener;
   determining a distance from the camera to the listener position using the reference distance information, the reference width information, and the image information about the listener,
   determining the distance including scaling the reference distance information according to a ratio of the reference width information to the characteristic width information; and
   generating, using an audio processor circuit, respective adjusted audio signals for playback using the first and second loudspeakers based on (1) the determined distance from the camera to the listener position, (2) information about positions of the first and second loudspeakers relative to the camera, and (3) the one or more received audio signals.

2. The method of claim 1, wherein determining the distance from the camera to the listener position includes receiving an indication of a head orientation of the listener, wherein the head orientation of the listener includes an indication of one or more of a head yaw, head pitch, or head roll of the listener, and wherein the generating the adjusted audio signals includes using the indication of the head yaw, head pitch, or head roll of the listener.

3. The method of claim 2, further comprising determining a distance parameter indicative of a distance from the speaker to each of two ears of the listener based on the received indication of the head orientation of the listener, and wherein the generating the adjusted audio signals includes generating at least a pair of audio signals using filters selected to compensate for the distance from the speaker to each of the two ears of the listener.

4. The method of claim 3, wherein the audio processor circuit includes a virtualizer circuit and a sweet spot adapter circuit;
   wherein the virtualizer circuit is configured to receive the one or more received audio signals and generate virtualized audio signals based on a first virtualization filter; and
   wherein the sweet spot adapter circuit is configured to receive the virtualized audio signals from the virtualizer circuit and provide the one or more adjusted audio signals based on the determined distance from the camera to the listener position.

5. The method of claim 4, wherein the sweet spot adapter circuit is configured to apply a gain and/or a delay to at least one audio signal channel of the received virtualized audio signals, wherein the gain and/or delay is based on the listener position.

6. The method of claim 1, wherein the audio processor circuit includes a virtualizer circuit and a sweet spot adapter circuit;
   wherein the sweet spot adapter circuit is configured to receive the one or more received audio signals and apply a gain and/or delay to provide an intermediate audio output based on the received first indication about the listener position; and
   wherein the virtualizer circuit is configured to receive the intermediate audio output from the sweet spot adapter circuit and apply audio virtualization processing using a first virtualization filter to generate the adjusted audio signals based on the listener position.

7. The method of claim 1, wherein the audio processor circuit includes a virtualizer circuit, and wherein the virtualizer circuit is configured to receive the one or more received audio signals and apply virtualization processing to the received one or more audio signals to generate the adjusted audio signals.

8. The method of claim 7, further comprising selecting, based on the listener position, a first virtualization filter to apply to the received one or more audio signals to generate the adjusted audio signals, wherein the first virtualization filter is:
   selected from among multiple available virtualization filters in a memory circuit; or determined, using the virtualizer circuit or another processor circuit, based on a mathematical model using the listener position as an input to the model; or determined using interpolation of multiple other filters.

9. The method of claim 7, further comprising:

receiving a subsequent indication about a listener position using information from the camera; and generating, using the audio processor circuit, the one or more adjusted audio signals based on a different second virtualization filter, wherein the virtualizer circuit is configured to select the different second virtualization filter based on the received subsequent indication about the listener position.

10. The method of claim 3, wherein the determining the distance from the camera to the listener position includes, using an image processing circuit:

determining a face width of the listener relative to the reference width information; and determining the distance from the camera to a head position of the listener using the determined face width of the listener.

11. The method of claim 3, wherein the determining the distance from the camera to the listener position includes:

determining an interpupillary distance of the listener relative to a reference interpupillary distance;

determining a head orientation of the listener; and providing an indication of a distance to a head position of the listener using the determined interpupillary distance and head orientation of the listener.

12. A system for adjusting one or more input audio signals based on a listener position relative to a speaker, the system comprising:

a camera configured to receive image data, without depth information, about a listener having a listener position in a listening environment, wherein the image data includes information about a face width of the listener and the face width is represented in a unit of angular measure;

an image processor circuit configured to determine a distance from the camera to the listener position using (a) the image data, without depth information, (b) reference distance information about a distance from a reference listener position to the camera, and (c) reference width information about a listener face width at the reference listener position; and an audio processor circuit configured to generate one or more adjusted audio signals based on (1) the determined distance from the camera to the listener position, (2) information about a position of the speaker relative to the camera, and (3) the one or more input audio signals;

wherein the image processor circuit is configured to determine the distance from the camera to the listener position by scaling the reference distance information according to a ratio of the reference width information about the listener face width to the information about the face width of the listener from the image data.

13. The system of claim 12, wherein the image processor circuit is configured to determine a head orientation of the listener based on the received image data, the head orientation including an indication of one or more of a head yaw, head pitch, or head roll of the listener; and wherein the audio processor circuit is configured to generate the one or more adjusted audio signals using the determined head orientation.

14. The system of claim 13, wherein at least one of the image processor circuit and the audio processor circuit is further configured to determine a distance parameter indicative of a distance from the speaker to each of two ears of the listener based on the indication of the one or more of the head yaw, head pitch, or head roll of the listener.

15. The system of claim 12, wherein the audio processor circuit comprises:

an audio input configured to receive the one or more input audio signals;

a virtualizer circuit coupled to the audio input and configured to use a virtualization filter to generate virtualized audio signals corresponding to the input audio signals, wherein the virtualization filter corresponds to the listener position;

a sweet spot adapter circuit configured to apply a gain and/or a delay to one or more of the virtualized audio signals to provide adjusted audio signals; and an audio output configured to provide the adjusted audio signals.

16. The system of claim 12, wherein the audio processor circuit comprises:

an audio input configured to receive the one or more input audio signals; and a virtualizer circuit coupled to the audio input and configured to use a virtualization filter to generate the one or more adjusted audio signals based on the input audio signals, wherein the virtualization filter is selected by the virtualizer circuit based on the listener position.

17. An apparatus for generating virtualized audio signals for playback to a first listener using loudspeakers in an environment, the virtualized audio signals based on input audio signals, the apparatus comprising:

a camera with an image processing circuit configured to:

receive image information, without depth information, from a first field of view of the camera, the image information including characteristic width information about a head or face of the first listener, and determine a distance from the camera to the first listener in the first field of view of the camera by scaling reference distance information about a distance from a reference listener position to the camera according to a ratio of reference width information about a listener face width at the reference listener position to the characteristic width information; and an audio processor circuit configured to generate virtualized audio signals for playback to the first listener using the loudspeakers, wherein the virtualized audio signals are based on (1) the determined distance from the camera to the first listener, (2) information about positions of the loudspeakers relative to the camera, and (3) the input audio signals;

wherein generating the virtualized audio signals includes selecting a head-related transfer function (HRTF) filter and applying the selected HRTF filter to the input audio signals.

18. The apparatus of claim 17, wherein the audio processor circuit comprises a virtualizer circuit and a sweet spot adapter circuit, wherein the virtualizer circuit is configured to generate an intermediate output signal by applying the HRTF filter to the input audio signals, wherein the HRTF filter is selected based on the determined distance from the camera to the first listener, and wherein the sweet spot adapter circuit is configured to generate the virtualized audio signals for the first listener in the environment by applying a gain and/or a delay to the intermediate output signal generated by the virtualizer circuit.

19. The method of claim 3, wherein the characteristic width information is in a unit of angular measure.

20. The apparatus of claim 17, wherein the image processor circuit is configured to determine the distance using information about one or more of a head yaw, head pitch, or head roll angle of the listener.

* * * * *